(12) United States Patent
Wendel et al.

(10) Patent No.: US 10,432,912 B2
(45) Date of Patent: Oct. 1, 2019

(54) TARGET, METHOD, AND SYSTEM FOR CAMERA CALIBRATION

(71) Applicant: Waymo LLC, Mountain View, CA (US)

(72) Inventors: Andreas Wendel, Mountain View, CA (US); Volker Grabe, Redwood City, CA (US); Jeremy Dittmer, Mountain View, CA (US); Zachary Morriss, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 61 days.

(21) Appl. No.: 15/720,979

(22) Filed: Sep. 29, 2017

(65) Prior Publication Data

US 2019/0104295 A1   Apr. 4, 2019

(51) Int. Cl.
| | |
|---|---|
| H04N 13/246 | (2018.01) |
| G06T 7/80 | (2017.01) |
| G01B 11/25 | (2006.01) |
| G06T 7/60 | (2017.01) |
| H04N 13/282 | (2018.01) |

(52) U.S. Cl.
CPC ....... *H04N 13/246* (2018.05); *G01B 11/2504* (2013.01); *G06T 7/60* (2013.01); *G06T 7/80* (2017.01); *H04N 13/282* (2018.05)

(58) Field of Classification Search
CPC ...... H04N 13/246; H04N 13/282; G06T 7/80; G06T 7/60; G01B 11/2504
See application file for complete search history.

(56) References Cited

U.S. PATENT DOCUMENTS

| | | | |
|---|---|---|---|
| 6,437,823 | B1 | 8/2002 | Zhang |
| 9,589,348 | B1 * | 3/2017 | Linde ................ G06T 7/80 |
| 2002/0003965 | A1 | 1/2002 | Landelle et al. |
| 2008/0031514 | A1 | 2/2008 | Kakinami |
| 2008/0181488 | A1 | 7/2008 | Ishii et al. |
| 2010/0165116 | A1 | 7/2010 | Hsieh et al. |
| 2010/0235129 | A1 | 9/2010 | Sharma et al. |
| 2010/0252628 | A1 | 10/2010 | Chung |
| 2012/0170922 | A1 | 7/2012 | Shuster |
| 2014/0285676 | A1 | 9/2014 | Barreto et al. |
| 2015/0248584 | A1 | 9/2015 | Greveson et al. |
| 2015/0288951 | A1 * | 10/2015 | Mallet .............. H04N 17/002 348/46 |
| 2015/0369757 | A1 | 12/2015 | Suichi Aso |

(Continued)

OTHER PUBLICATIONS

"Fiducial Marker Detection Using FPGAs"; Peter Samarin, et al; Sep. 28, 2013.

(Continued)

*Primary Examiner* — Leon Flores
(74) *Attorney, Agent, or Firm* — Mcdonnell Boehnen Hulbert & Berghoff LLP

(57) ABSTRACT

The present disclosure relates to a target, a method, and a system for calibrating a camera. One example embodiment includes a target. The target includes a first pattern of fiducial markers. The target also includes a second pattern of fiducial markers. The first pattern of fiducial markers is a scaled version of the second pattern of fiducial markers, such that a calibration image captured of the target simulates multiple images of a single pattern captured at multiple calibration perspectives.

20 Claims, 20 Drawing Sheets

(56) References Cited

U.S. PATENT DOCUMENTS

2016/0094840 A1 3/2016 Warner
2016/0124431 A1 5/2016 Kelso
2017/0221226 A1 8/2017 Shen et al.

OTHER PUBLICATIONS

"Digital Camera Calibration Methods: Considerations and Comparisons"; Fabio Remondino, et al.; ISPRS Commission V Symposium 'Image Engineering and Vision Metrology'; Nov. 2005.
"Camera Calibration Without Feature Extraction"; Luc Robert; Research Report RR-2204, INRIA; 1994.
"Geometric Calibration of Digital Cameras Through Multi-View Rectification"; Luca Lucchese; Image and Vision Computing; Jan. 14, 2005.
"On-line Calibration of Multiple LIDARs on a Mobile Vehicle Platform"; Chao Gao, et al.; 2010 IEEE International Conference on Robotics and Automation (ICRA); May 3-7, 2010.
"Calibration of a PMD-Camera Using a Planar Calibration Pattern Together with a Multi-Camera Setup"; Ingo Schiller, et al.; Mar. 2012.
"Novel Method for Structured Light System Calibration"; Song Zhang, et al.; Selected Works of Song Zhang; Aug. 21, 2006.
"OCPAD—Occluded Checkerboard Pattern Detector"; Peter Fuersattel, et al.; 2016 IEEE Winter Conference on Applications of Computer Vision (WACV); Mar. 7-10, 2016.
"Calibration Between Depth and Color Sensors for Commodity Depth Cameras"; Cha Zhang, et al; Jul. 15, 2014.
"Extrinsic Calibration Between a Multi-Layer Lidar and a Camera"; Sergio Alberto Rodriguez Florez, et al.; IEEE International Conference on Multisensor Fusion and Integration for Intelligent Systems, MFI 2008, South Korea, pp. 214-219; Aug. 2008.
"ROCHADE: Robust Checkerboard Advanced Detection for Camera Calibration"; Simon Placht, et al.; ECCV, Zurich, Switzerland, vol. 8692; Sep. 2014.
"Self-identifying Patterns for Plane-based Camera Calibration"; Mark Flala, et al.; Machine Vision and Applications 19:209-216; Aug. 3, 2007.
"Pan-tilt-zoom Camera Calibration and High-resolution Mosaic Generation"; Sudipta N. Sinha, et al.; Journal of Computer Vision and Image Understanding—Special Issue on Omnidirectional Vision and Camera Networks, vol. 103, Issue 3, pp. 170-183; Sep. 2006.
"Flexible and User-Centric Camera Calibration using Planar Fiducial Markers"; S. Daftry, et al.; Proceedings of the British Machine Vision Conference; pp. 19.1-19.13; Jan. 2013.
"Survey of Optical Indoor Positioning Systems"; R. Mautz, et al.; 2011 International Conference on Indoor Positioning and Indoor Navigation (IPIN); Sep. 21-23, 2011; IEEE.
YouTube Video entitled "Our Road to Self-Driving Vehicles | Uber ATG"; uploaded on Sep. 19, 2017; screenshots included; URL: https://youtu.be/27OuOCeZmwI; retrieved on Sep. 28, 2017.
"Camera Calibration with OpenCV"; OpenCV 2.4.13.6 documentation » OpenCV Tutorials » calib3d module. Camera calibration and 3D reconstruction; URL: https://docs.opencv.org/2.4/doc/tutorials/calib3d/camera_calibration/camera_calibration.html; retrieved on Apr. 27, 2018.
"Flexible Camera Calibration by Viewing a Plane From Unknown Orientations"; Zhengyou Zhang; The Proceedings of the Seventh IEEE International Conference on Computer Vision, 1999; Sep. 20-27, 1999.
"Camera Calibration and 3D Reconstruction"; OpenCV 2.4.13.6 documentation » OpenCV API Reference » calib3d. Camera Calibration and 3D Reconstruction; URL: https://docs.opencv.org/2.4/modules/calib3d/doc/camera_calibration_and_3d_reconstruction.html; retrieved on Apr. 27, 2018.
"A Combined Corner and Edge Detector"; Chris Harris, et al.; In Proc. of Fourth Alvey Vision Conference, pp. 147-151; 1988.
"Good Features to Track"; Jianbo Shi, et al.; IEEE Conference on Computer Vision and Pattern Recognition (CVPR94) Seattle; Jun. 1994.
"Feature Detection"; OpenCV 2.4.13.6 documentation » OpenCV API Reference » imgproc. Image Processing; URL: https://docs.opencv.org/2.4/modules/imgproc/doc/feature_detection.html; retrieved on Apr. 27, 2018.
"Subpixel Corners: Increasing accuracy"; Utkarsh Sinha; AI Shack; URL: http://aishack.in/tutorials/subpixel-corners-increasing-accuracy/; retrieved on Apr. 27, 2018.
"Subpixel Measurements Using a Moment-Based Edge Operator"; Edward P. Lyvers, et al.; IEEE Transactions on Pattern Analysis and Machine Intelligence, vol. 11, No. 12; Dec. 1989.
"Subpixel Precision Corner Detection and Localization"; Robert M. Haralick, et al.; URL: http://haralick.org/conferences/Subpixel_Corner.pdf; retrieved on Apr. 27, 2018.
"A Fast Subpixel Edge Detection Method Using Sobel-Zernike Moments Operator"; Qu Ying-Dong, et al.; Image and Vision Computing 23, pp. 11-17; 2005.
"Recovering and Characterizing Image Features Using an Efficient Model Based Approach"; Thierry Blaszka, et al.; RR-2422, INRIA; 1994.
YouTube video entitled "Assisted Camera Calibration"; URL: https://youtu.be/3SWX1iQRbsg; Uploaded by user BoofCV; Uploaded to YouTube on Jun. 5, 2016; Screenshots included.
"Precise Ellipse Estimation Without Contour Point Extraction"; Jean-Nicolas Ouellet, et al.; Machine Vision Applications, vol. 21, Issue 1, pp. 59-67; Oct. 12, 2009.
"A Robust Hough Transform Algorithm for Determining the Radiation Centers of Circular and Rectangular Fields with Subpixel Accuracy"; Weiliang Du, et al.; Physics in Medicine & Biology, vol. 54, No. 3; Jan. 6, 2009.
International Search Report and Written Opinion dated Mar. 4, 2019 issued in connection with International Application No. PCT/US2018/051690, filed on Sep. 19, 2018, 12 pages.

* cited by examiner

FIG. 1E  FIG. 1F

TARGET, METHOD, AND SYSTEM FOR CAMERA CALIBRATION

BACKGROUND

Unless otherwise indicated herein, the materials described in this section are not prior art to the claims in this application and are not admitted to be prior art by inclusion in this section.

Cameras have become ubiquitous when it comes to recording images. Various cameras may record images on film or digitally store images as a series of bits within a computer memory (e.g., a hard drive). Many devices even have cameras integrated in them. For example, mobile phones, tablets, and laptop computers may include cameras.

One application for cameras is in the field of computer vision. In computer vision, in order to make inferences from recorded images, calibrating the camera recording the images can be important. Such a calibration can provide a correlation of the appearance of a recorded image to the spatial layout of a physical scene. Further, calibration can correct for defects in the fabrication and/or assembly of a camera sensor/lens used to record images. For example, if an aperture of a camera is off-center with respect to a camera sensor, a calibration may account for this (e.g., using a processor that provides a correction to recorded images such that they more accurately reflect a physical scene).

One method of calibrating cameras includes applying the pinhole camera model. The pinhole camera model assumes the camera being calibrated is an ideal pinhole camera (i.e., a camera with no lenses and a point-like aperture). Using the pinhole camera model approximation, the coordinates (e.g., in three-dimensions) of a physical scene may be mapped to a projection on a two-dimensional plane, where the projection on the two-dimensional plane is represented by a recorded calibration image. The location of the pinhole aperture in the theoretical pinhole camera can be determined based on the calibration image. Other parameters of the theoretical pinhole camera can also be determined (e.g., focal length). If the location of the pinhole aperture is not centered with respect to the camera sensor, steps can be taken to account for the off-center location of the aperture. Determining the location of the pinhole aperture and accounting for it may include calculating one or more elements of a camera matrix based on one or more calibration images.

Other methods of calibration can be employed to correct for other defects inherent in optical design or due to fabrication/assembly, as well. For example, one or more distortion coefficients can be calculated based on a recorded calibration image. The distortion coefficient may be used to account for optical non-uniformities arising due to a lens in the camera (e.g., barrel distortions, mustache distortions, or pincushion distortions). In addition, other optical aberrations can be accounted for using calibration (e.g., defocusing, tilting, spherical aberrations, astigmatism, coma, or chromatic aberrations).

SUMMARY

An example calibration target may allow for a camera to be calibrated. The calibration target may include two or more panels each with a series of fiducial markers thereon. The panels may be angled with respect to one another and the fiducial markers may be positioned in one or more arrangements. The fiducial markers on the panels may be uniquely identifiable. When a camera to be calibrated captures or records a calibration image of the calibration target, multiple calibration images from different angular perspectives (e.g., different camera perspectives) of a single panel may be simulated by a single calibration image of the two or more panels. This because the two or more panels are angled with respect to one another. Simulating multiple images with a single calibration image may decrease computational resources necessary for calibration as well as reduce calibration time.

In a first aspect, the disclosure describes a target used for calibration. The target includes a first pattern of fiducial markers. The target also includes a second pattern of fiducial markers. The first pattern of fiducial markers is a scaled version of the second pattern of fiducial markers, such that a calibration image captured of the target simulates multiple images of a single pattern captured at multiple calibration perspectives.

In a second aspect, the disclosure describes a method. The method includes recording a calibration image of a target using a camera. The target includes a first panel having a first arrangement of fiducial markers thereon. Each of the fiducial markers in the first arrangement is uniquely identifiable among fiducial markers in the first arrangement. The target also includes a second panel, disposed at a first angle relative to the first panel, having a second arrangement of fiducial markers thereon. Each of the fiducial markers in the second arrangement is uniquely identifiable among fiducial markers in the second arrangement. The first arrangement of fiducial markers matches the second arrangement of fiducial markers. The method also includes determining locations and identifications of one or more fiducial markers in the calibration image. In addition, the method includes, based on the determined locations and identifications, calibrating the camera.

In a third aspect, the disclosure describes a system used for calibrating a camera. The system includes a target. The target includes a first pattern of fiducial markers. The target also includes a second pattern of fiducial markers. The first pattern of fiducial markers is a scaled version of the second pattern of fiducial markers, such that a calibration image captured of the target simulates multiple images of a single pattern captured at multiple calibration perspectives. The system also includes a stage configured to translate or rotate the camera with respect to the target.

In an additional aspect, the disclosure describes a system. The system includes a means for recording a calibration image of a target using a camera. The target includes a first panel having a first arrangement of fiducial markers thereon. Each of the fiducial markers in the first arrangement is uniquely identifiable among fiducial markers in the first arrangement. The target also includes a second panel, disposed at a first angle relative to the first panel, having a second arrangement of fiducial markers thereon. Each of the fiducial markers in the second arrangement is uniquely identifiable among fiducial markers in the second arrangement. The first arrangement of fiducial markers matches the second arrangement of fiducial markers. The system also includes a means for determining locations and identifications of one or more fiducial markers in the calibration image. In addition, the system includes a means for calibrating the camera based on the determined locations and identifications.

The foregoing summary is illustrative only and is not intended to be in any way limiting. In addition to the illustrative aspects, embodiments, and features described

BRIEF DESCRIPTION OF THE FIGURES

FIG. 1E is an illustration of a calibration process.

FIG. 1F is an illustration of a calibration process.

DETAILED DESCRIPTION

Figure 1A:
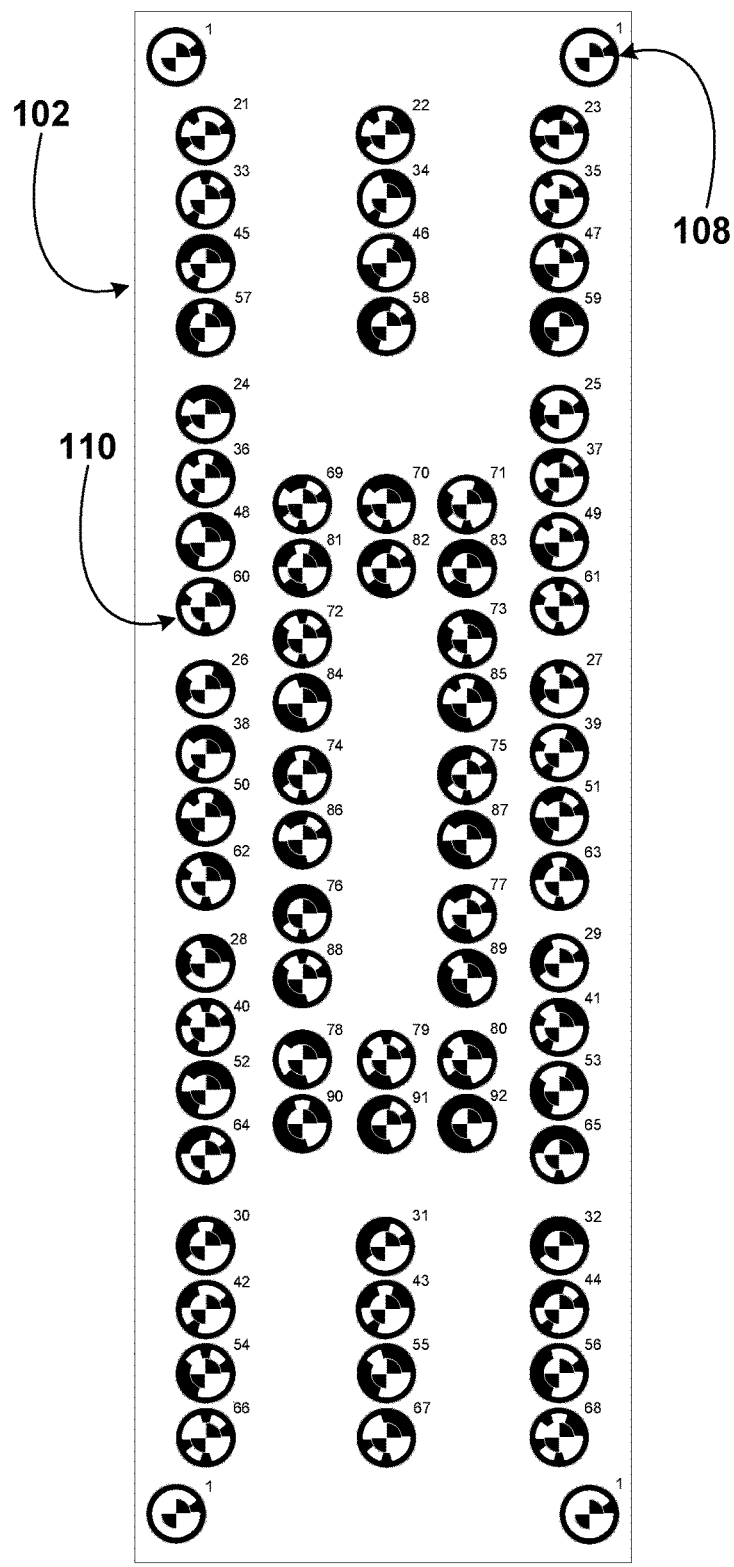
FIG. 1A is an illustration of a panel of a calibration target, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. Overview

Example embodiments relate to a target, method, and system for camera calibration. A target used for camera calibration as described herein may reduce calibration time, reduce computing resources needed for calibration, reduce the space needed for calibration, reduce the mechanical complexity of calibration, and reduce the number of calibration images that need to be captured or recorded in order for calibration to successfully be completed. Using a target as described herein may improve calibration efficiency because the calibration target is designed in such a way that when a single calibration image is captured or recorded of the calibration target, additional calibration images can be simulated.

For example, in some embodiments, the calibration target may include fiducial markers located thereon. The fiducial markers may be arranged on two or more panels. Further, the fiducial markers may be arranged in patterns on each panel. At least two of the patterns on a given panel may be scaled versions of one another (e.g., one pattern of fiducial markers is a smaller square and another pattern of fiducial markers is a larger square). Such patterns can be used in a captured or recorded calibration image of the calibration target (e.g., captured or recorded by a camera requiring calibration) as a simulation of multiple camera locations. Rather than having to reposition a calibration target relative to the camera and capture or record multiple images, as may be the case in alternate calibration schemes, a single calibration image can be used to calibrate various camera perspectives relative to the calibration target (e.g., distances from the calibration target or angles relative to the calibration target). In embodiments where the calibration includes using a pinhole camera model to calibrate the location of an aperture of the camera, multiple calibration images from different perspectives may be used. Thus, having a single calibration image that can represent multiple camera perspectives may save calibration time, calibration space, mechanical complexity, and/or computational resources.

In addition to having a calibration target that can be used to simulate multiple camera perspectives in one degree of freedom (e.g., multiple distances from the camera, i.e., z-direction), some example embodiments include a calibration target where two panels are positioned at angle(s) relative to one another. In such embodiments, the arrangement of the fiducial markers on the two panels may be substantially or exactly the same. Given the angle(s) of the panels relative to one another, one or more additional degrees of freedom (e.g., rotation about the x-axis, y-axis, and/or z-axis) may be simulated within a single captured or recorded calibration image of the calibration target. For example, two panels may be rotated about ay-axis with respect to one another (e.g., by 30°). This may allow a camera at a single perspective relative to the calibration target to capture or record one perspective relative to the first panel in the calibration target and a second perspective relative to the second panel in the calibration target. Because the two panels may be substantially or exactly the same (e.g., have similar, or even identical, fiducial markers arranged thereon), the single calibration image can be used to calibrate for two angular perspectives relative to the panels. Additional embodiments may include calibration targets that have additional angles between panels and/or fiducial-marker pattern shifts to simulate additional degrees of freedom in captured or recorded calibration images of the respective calibration target.

Additionally, the fiducial markers on the calibration targets/panels may be designed such that a location on the fiducial marker (e.g., the center of the fiducial marker) and an identity of the fiducial marker (e.g., name or ID of the fiducial marker) can be identified (e.g., by a human reviewing a captured or recorded calibration image and/or by a processor analyzing a captured or recorded calibration image to perform camera calibration). In order to accomplish this, one example embodiment includes fiducial markers that each have four distinct regions. One region may be a crosshair region used to pinpoint a location of the center of the fiducial marker. A second region may be a fiducial marker identification section that can be used to identify the fiducial marker is (e.g., the ID of a given fiducial marker). In some embodiments, the second region may be an angular barcode section that has a series of angular bits used to represent the ID of the fiducial marker as a barcode. A third region of a fiducial marker may be a fiducial bounding section that can be used to identify an edge/boundary of the fiducial marker, as well as to determine whether a fiducial marker is actually present in a calibration image (e.g., as opposed to noise in a calibration image). Lastly, a fourth region of a fiducial marker may be a human-readable label that may readily indicate an ID of the fiducial marker to a human. In some embodiments, fewer or greater than four regions may be included in a fiducial marker. For example, in some embodiments, fiducial markers may include only the crosshair region and a fiducial bounding section. Additionally, in some embodiments, various fiducial markers across the same embodiment may include different subsets of the four regions described above (e.g., one fiducial marker may include all four regions described above while another fiducial marker may include only the crosshair region).

In some embodiments (e.g., embodiments where two or more panels of a calibration target have a similar or the same arrangement of fiducial markers thereon), one or more of the fiducial markers on each panel may be used as a panel-identification fiducial marker. A panel-identification fiducial marker can be used during calibration (e.g., during image analysis of a calibration image) to determine which panel, of a number of panels having similar appearances, is currently being analyzed. Other methods of panel identification are also possible.

II. Example Systems

The following description and accompanying drawings will elucidate features of various example embodiments. The embodiments provided are by way of example, and are not intended to be limiting. As such, the dimensions of the drawings are not necessarily to scale.

FIG. 1A is an illustration of a first panel 102 of a calibration target, according to example embodiments. The calibration target may be used in the process of calibrating one or more cameras. For example, the calibration target may be used to capture or record one or more calibration images. The captured or recorded calibration images may then be used to determine features about the camera (e.g., distortion coefficients, camera matrices, lens position/orientation, camera sensor position/orientation, aperture position/orientation, etc.). Once the features about the camera are determined (e.g., using a pinhole camera approximation model), any defects or irregularities may be accounted for. Accounting for defects or irregularities may include modifying the aperture of the camera, adjusting the location of one or more lenses of the camera, adjusting the location of one or more image sensors of the camera, modifying the exposure time for images, changing the image resolution captured or recorded by the camera, or performing post-processing of images captured or recorded by the camera to correct for defects/irregularities (e.g., by estimating parameters such as focal length or radial distortion to correct projections from a scene to a captured or recorded image or to un-distort a captured or recorded image).

A variety of cameras may benefit from calibration using the calibration target. For example, the cameras calibrated may be components of autonomous vehicles used for navigation or object recognition. Further, the cameras calibrated may have a variety of different features (e.g., varying focal lengths, different lens types, different image sensors, etc.). The calibration target may be used to calibrate digital cameras (i.e., cameras that store images electrically or magnetically as a series of bits), such as digital cameras having charge-coupled devices (CCDs) or complementary metal-oxide-semiconductor (CMOS) image sensors, or to calibrate film cameras (i.e., cameras that store images chemically on a strip of photographic film).

The first panel 102 may include a series of fiducial markers 110 arranged thereon. It is understood that, in order to avoid clutter in the illustration, only one of the fiducial markers 110 is labeled in FIG. 1A. The fiducial markers 110 are further described below with reference to FIG. 1C. Briefly, however, each fiducial marker 110 may include a region used to identify that a fiducial marker has been found (e.g., during image analysis as part of calibration), a region to identify which fiducial marker 110 it is, a region to pinpoint a center of the fiducial marker 110, and a human-readable label of the fiducial marker 110. A subset of the fiducial markers 110 may be used to identify the first panel 102 as the first panel 102. These fiducial markers 110 may be referred to as first-panel-identification fiducial markers 108. For example, the fiducial markers 110 nearest to the corners of the first panel 102 may indicate the identity of the first panel 102.

Another subset of the fiducial markers 110 (e.g., all of the fiducial markers 110 other than the first-panel-identification fiducial markers 108) may be in a first arrangement of fiducial markers 110. The first arrangement of fiducial markers 110 may include multiple patterns of fiducial markers 110. For example, the first arrangement of fiducial markers 110 may include at least a first pattern of fiducial markers 110 and a second pattern of fiducial markers 110. The second pattern of fiducial markers 110 may be a scaled version of the first pattern of fiducial markers 110. "Patterns" of fiducial markers 110 may be sets of locations on the first panel 102 where fiducial markers 110 are positioned. In various embodiments, there may be various patterns on the first panel 102 (described further with reference to FIGS. 6A-6E). Further, a "scaled version" may include a scaling of the locations of the fiducial markers (e.g., within a pattern) only, rather than a scaling of both the locations of the fiducial markers and the size of the fiducial markers. In alternate embodiments, however, both the scaling of both the locations of the fiducial markers and the size of the fiducial markers may be employed.

Figure 1B:
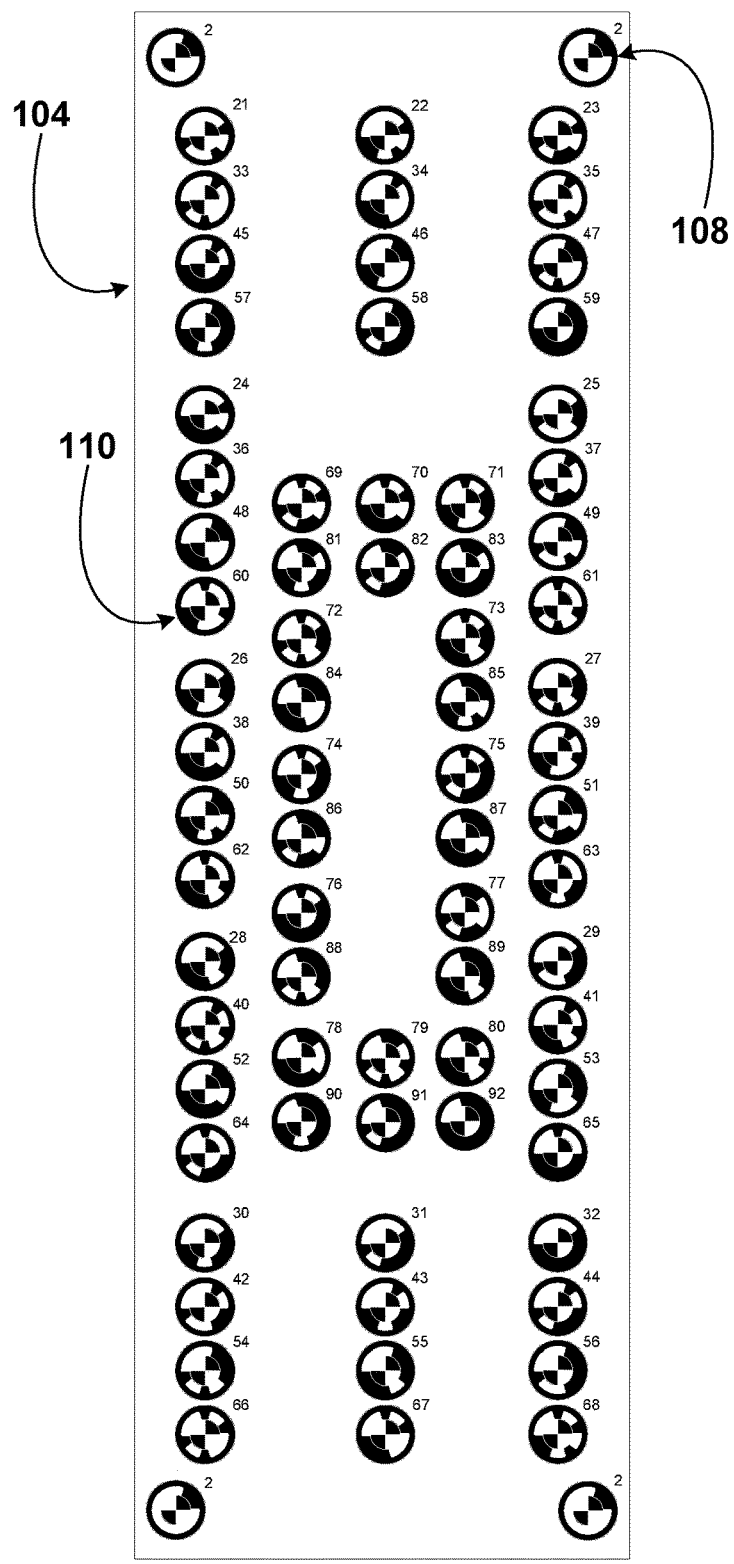
FIG. 1B is an illustration of a panel of a calibration target, according to example embodiments.

Illustrated in FIG. 1B is a second panel 104 of a calibration target. The second panel 104 may be a portion of the same calibration target as the first panel 102. Similar to the first panel 102, the second panel 104 may include a series of fiducial markers 110 arranged thereon. Again, only one of the fiducial markers 110 is labeled to avoid cluttering the figure. Like the first panel 102, a subset of the fiducial markers 110 may be used as second-panel-identification fiducial markers 108. For example, the fiducial markers 110 nearest to the corners of the second panel 104 may indicate the identity of the second panel 104.

Similarly another subset of the fiducial markers 110 (e.g., all of the fiducial markers 110 other than the second-panel-identification fiducial markers 108) may be in a second arrangement of fiducial markers 110. The second arrangement of fiducial markers 110 may include multiple patterns of fiducial markers 110. For example, the second arrangement of fiducial markers 110 may include at least a third pattern of fiducial markers and a fourth pattern of fiducial markers 110. The fourth pattern of fiducial markers 110 may be a scaled version of the third pattern of fiducial markers 110. In various embodiments, there may be various patterns on the second panel 104. This will be described further with reference to FIGS. 6A-6E.

As illustrated in FIG. 1B, the fiducial markers 110 in the second arrangement of the second panel 104 may be rotations of the fiducial markers 110 in the first arrangement of the first panel 102. In the embodiment illustrated, the fiducial markers 110 in the second arrangement are 180° rotations of the fiducial markers 110 that are in corresponding locations in the first arrangement. In alternate embodiments, alternate rotations are also possible (e.g., 15°, 30°, 45°, 60°, 75°, 90°, 105°, 120°, 135°, 150°, 165°, 195°, 210°, 225°, 240°, 255°, 270°, 285°, 300°, 315°, 330°, 345°, or any values there between). In still other embodiments, only some of the fiducial markers 110 in the second arrangement may be rotated with respect to the fiducial markers 110 in the first arrangement (e.g., only those fiducial markers 110 corresponding to a particular subset of patterns of the first arrangement).

The rotation of the fiducial markers 110 in the second arrangement with respect to the fiducial markers 110 in the first arrangement 110 may provide features that distinguish the first panel 102 from the second panel 104. These additional features may be used in addition to the panel-identification fiducial markers 108 to identify a given panel. Additionally or alternatively, all or a portion of one or more of the fiducial markers 110 in the first arrangement may be of a first color and all or a portion of one or more of the fiducial markers 110 in the second arrangement may be of a second color. The first color and the second color may be different colors (e.g., blue and orange, yellow and red, brown and silver, light purple and dark purple, forest green and neon green, etc.), which may provide yet another feature that can be used to distinguish between the first panel 102 and the second panel 104.

When designing the first panel 102 and the second panel 104 illustrated in FIGS. 1A and 1B, respectively, the fiducial markers 110 may be designed based on an anticipated location of the camera during calibration, the focal length of the camera, the zoom of the camera during calibration, and/or the resolution of the camera. The smaller the fiducial markers are with respect to the first panel 102 or the second panel 104, the more fiducial markers 110 can fit on the respective panel. Increasing the number of fiducial markers 110 that can fit on the respective panels can increase the number of calibration points (e.g., positions in three-dimensional space whose corresponding two-dimensional location is used to calibrate an image), and ultimately increase the accuracy of a calibration. However, the fiducial markers 110 need to be of at least a minimum resolvable size based on the camera given its zoom, resolution, focal length, distance from the calibration target, etc. Thus, the fiducial markers 110 on the first panel 102 and the second panel 104 may be sized such that they are of the smallest size still resolvable by the camera, such that the maximum number of fiducial markers 110 can be positioned on the first panel 102 and the second panel 104. Further, the fiducial markers 110 on the first panel 102 and the second panel 104 may be spaced relative to one another such that the maximum number of fiducial markers 110 can be positioned on the first panel 102 and the second panel 104.

In the embodiments of the first panel 102 and the second panel 104 of FIGS. 1A and 1B, there are six patterns of fiducial markers 110 in the first arrangement and six patterns of fiducial markers 110 in the second arrangement. This is illustrated in FIG. 1D. As illustrated in FIG. 1D, the first arrangement of the first panel 102 and the second arrangement of the second panel 104 include each fiducial marker 110 labeled with a "1," "2," "3," "4," "5," or "6." The fiducial markers 110 labeled in FIG. 1D with a "0" represent the panel-identification fiducial markers 108. The fiducial markers 110 labeled with a "1" are each part of the first pattern, the fiducial markers 110 labeled with a "2" are each part of the second pattern, the fiducial markers 110 labeled with a "3" are each part of the third pattern, the fiducial markers 110 labeled with a "4" are each part of the fourth pattern, the fiducial markers 110 labeled with a "5" are each part of the fifth pattern, and the fiducial markers 110 labeled with a "6" are each part of the sixth pattern of the first arrangement and the second arrangement of the first panel 102 and the second panel 104, respectively. As such, there are 72 fiducial markers in the first arrangement and the second arrangement (e.g., twelve fiducial markers in each of six patterns) and 76 fiducial markers total on the first panel 102 and the second panel 104 (e.g., twelve fiducial markers in each of six patterns, and four panel-identification fiducial markers). In other embodiments, there may be more or fewer fiducial markers in each arrangement or on each panel. An increased number of fiducial markers may increase the resolution with which the calibration of a camera can be performed. Alternatively, a reduced number of fiducial markers may increase the speed at which the calibration of a camera can be performed.

As illustrated in FIG. 1D, the fifth pattern and the sixth pattern are scaled versions (e.g., rectangles that have been scaled, potentially independently, in both a horizontal direction and a vertical direction) of the first, second, third, and fourth patterns. In alternate embodiments, there may be only two patterns in the first arrangement/second arrangement. In such embodiments, a second pattern may be a scaled version of the first pattern. In still other embodiments, there may be any number of patterns (e.g., 3, 4, 5, 7, 8, 9, 10, 15, 20, 50, or 100 patterns). Further, any number of patterns may be scaled versions of any other patterns.

It is understood that the Arabic numerals used to label the fiducial markers 110 in FIG. 1D are not meant to necessarily represent the actual appearance of fiducial markers 110 in reductions to practice, but are instead used to illustrate the various patterns of the first panel 102/second panel 104.

Figure 1C:
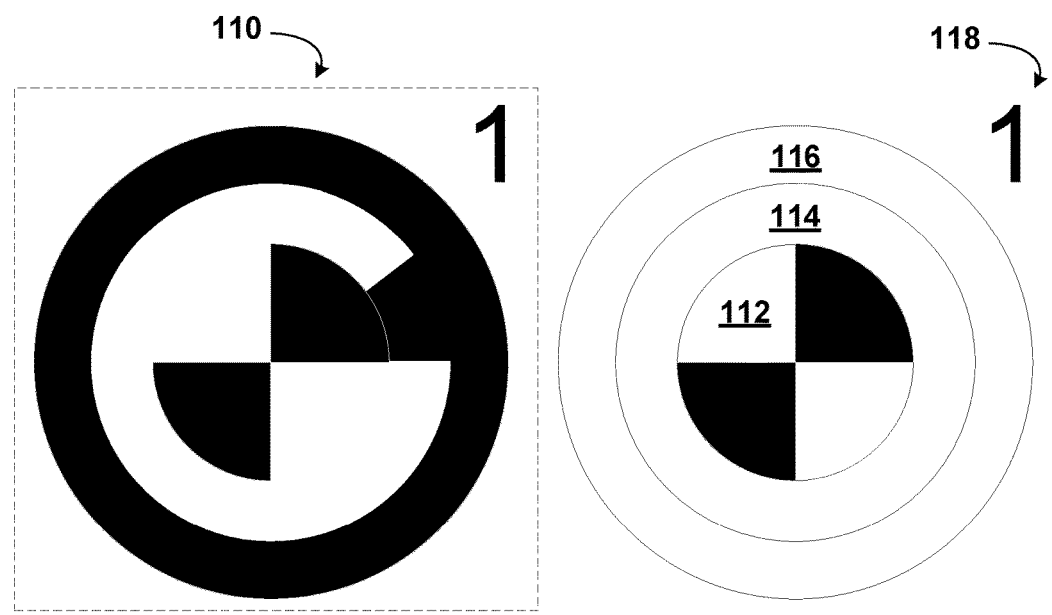
FIG. 1C is an illustration of a fiducial marker, according to example embodiments.
Figure 1D:
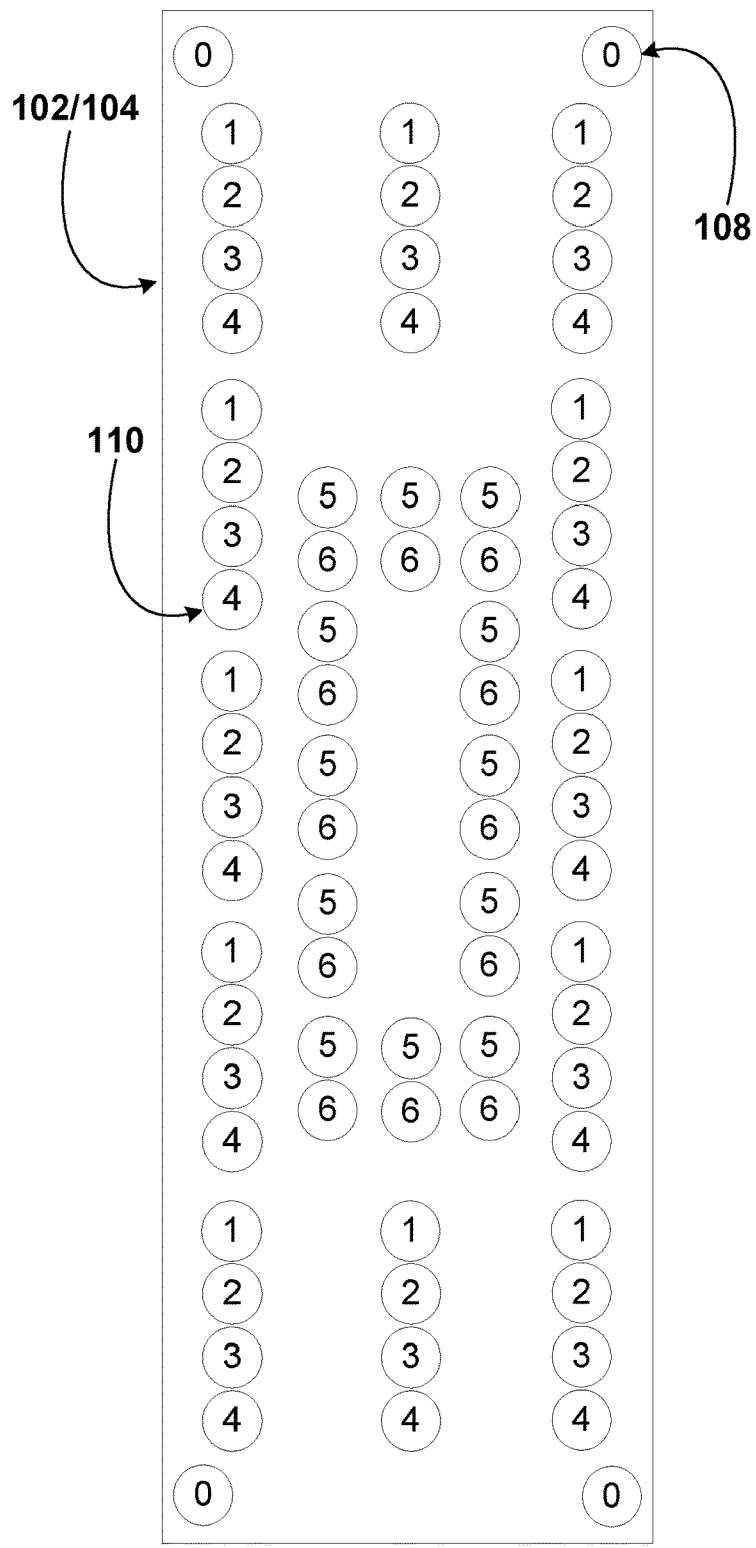
FIG. 1D is an illustration of a panel of a calibration target, according to example embodiments.

FIG. 1C is an illustration of a fiducial marker 110 of a calibration target. The fiducial marker 110 may be one of the fiducial markers 110 of the first panel 102 or the second panel 104 illustrated in FIGS. 1A and 1B, respectively. Illustrated on the left of FIG. 1C is an example fiducial marker 110 as it may appear on an example embodiment of the first panel 102 (e.g., a first-panel-identification fiducial marker 108). Illustrated on the right of FIG. 1C is a blank fiducial marker where different sections of the fiducial marker are labeled for identification. As illustrated in FIG. 1C, the fiducial markers 110 of the first panel 102 and/or the second panel 104 may be circular in shape. Also as illustrated, fiducial markers may include crosshairs 112, an angular barcode section 114, a fiducial bounding section 116, and a human-readable label 118.

The fiducial marker 110 illustrated in FIG. 1C may be designed in such a way as to accomplish multiple goals. First, the fiducial marker 110 may be designed such that its center can be located (e.g., the two-dimensional center can be determined based on the fiducial marker). In addition, the fiducial marker 110 may be designed such that its identity can be determined among other fiducial markers on the same panel or calibration target. When performing image analysis on the fiducial marker 110, a processor executing a set of calibration instructions may establish the outer bounds of the fiducial marker 110 using the fiducial bounding section 116, determine which fiducial marker is being analyzed using the angular barcode section 114, and determine where the center of the fiducial marker 110 is using the crosshairs 112.

In alternate embodiments, the fiducial markers may have various other shapes (e.g., a triangular shape, a rectangular shape, a pentagonal shape, a hexagonal shape, a heptagonal shape, an octagonal shape, a nonagonal shape, a decagonal shape, etc.). Further, within a single embodiment, different fiducial markers may have different shapes. For example, the fiducial markers in the first pattern of the first arrangement may be rectangular and the fiducial markers in the second pattern of the first arrangement may be triangular. Multiple different subsets of fiducial markers on the same panel, arrangement, or pattern may have different shapes to identify different portions of the respective panel, arrangement, or pattern. Additionally or alternatively, fiducial markers in some embodiments may have special optical properties (e.g., a fiducial marker may be holographic).

The crosshairs 112 may be used to identify the center of the fiducial marker 110 (e.g., where the center of the fiducial marker 110 is located). The crosshairs 112 may alternatively be referred to as a "reticle," in some embodiments. The location of a specific fiducial marker (e.g., the horizontal and vertical coordinates within a calibration image) and the identity of the fiducial marker may both be used in calibrating a camera using a calibration target that includes one or more fiducial markers thereon. In some embodiments, the crosshairs 112 may include the intersection of two dark regions and two light regions, as illustrated in FIG. 1C. In alternate embodiments, the crosshairs 112 may use a dot on the center of the fiducial marker, two perpendicular lines crossing on the center of the fiducial marker, a circle whose center is the center of the fiducial marker, an arrow or line that points to or originates from the center of the fiducial marker, or a chevron that points to the center of the fiducial marker.

The angular barcode section 114 may be used to identify a fiducial marker within a calibration image. In the embodiment illustrated in FIG. 1C, the angular barcode section 114 may be an annular section surrounding the crosshairs 112. The angular barcode section 114 may be broken into a series of bits (e.g., 4 bits, 8 bits, 10 bits, 16 bits, 24 bits, 32 bits, 64 bits, 128 bits, 256 bits, etc.), each bit represented by a specific angular portion of the angular barcode section 114. For example, if the angular barcode section 114 is broken into 8 bits, the first bit may be represented by a portion of the angular barcode section 114 that runs from about 0°-about 45° (progressing counterclockwise around the angular barcode section 114) in the first quadrant of the angular barcode section 114. Similarly the second bit may run from about 45°-about 90° in the first quadrant, the third bit may run from about 90°-about 135° in the second quadrant, the fourth bit may run from about 135°-about 180° in the second quadrant, the fifth bit may run from about 180°-about 225° in the third quadrant, the sixth bit may run from about 225°-about 270° in the third quadrant, the seventh bit may run from about 270°-about 315° in the fourth quadrant, and the eighth bit may run from about 315°-about 360° in the fourth quadrant. Each bit may be filled in, either in black (e.g., representing a 0) or in white (e.g., representing a 1). Using this schema, various numbers can represented in binary in the angular barcode section 114.

The numbers represented in the angular barcode section 114 may be used to identify a given fiducial marker. As illustrated in FIGS. 1A and 1B, all of the fiducial markers within the first arrangement and the second arrangement may have unique angular barcode sections; thus making each fiducial marker in the first arrangement uniquely identifiable and each fiducial marker in the second arrangement uniquely identifiable. In some embodiments, in addition to or alternate to the angular barcode section 114, the location of a fiducial marker on a panel, the location of a fiducial marker within an arrangement or pattern, the size of a fiducial marker, the orientation of a fiducial marker, or the color of a fiducial marker may be used to uniquely identify a fiducial marker. For example, in some embodiments, each fiducial marker may appear the same, but based on their positions relative to the rest of the fiducial markers in an arrangement and their positions on a panel, each fiducial marker may be unique identified. Such may be the case in embodiments where the fiducial markers are squares in a checkerboard pattern, for instance.

Further, each of the angular barcode sections in the first arrangement and the second arrangement of some embodiments, including the embodiments illustrated in FIGS. 1A and 1B, may be rotationally unique. This means that, for a given angular barcode of a given fiducial marker, even if that fiducial marker and/or that angular barcode is rotated by any angle between 0° and 360°, it will not match another angular barcode being used. As an example, if the angular barcode 1-0-0-0-0-0-0-0-0 (the first bit being the most significant bit, the last bit being the least significant bit) were used in a set of angular barcodes that included ten bits and was rotationally unique, the angular barcodes 0-1-0-0-0-0-0-0-0-0, 0-0-1-0-0-0-0-0-0-0, 0-0-0-1-0-0-0-0-0-0, 0-0-0-0-1-0-0-0-0-0, 0-0-0-0-0-1-0-0-0-0, 0-0-0-0-0-0-1-0-0-0, 0-0-0-0-0-0-0-1-0-0, 0-0-0-0-0-0-0-0-1-0, and 0-0-0-0-0-0-0-0-0-1 could not be used because they rotationally overlap with 1-0-0-0-0-0-0-0-0-0. Thus, in order to preserve the rotationally unique set, some angular barcodes will be skipped over. Therefore, there is not necessarily a 1-to-1 correlation between possible angular barcodes and angular barcodes actually employed in a given pattern, arrangement, panel, or calibration target, especially in embodiments having rotational uniqueness among angular barcodes.

In some embodiments, however, all angular barcodes may be used. In such embodiments, the angular barcodes may be oriented on the panels in such a way that, even though the fiducial markers would rotationally overlap, the orientation of each fiducial marker prevents actual angular barcode overlapping.

Further, in some embodiments, the angular barcodes may be used in a calibration method to determine the angular orientation of the respective fiducial marker. For example, the angular orientation of a fiducial marker may be determined according to the calibration method to an accuracy of 360° divided by the number of bits used to encode the angular barcode.

In the examples shown in FIGS. 1A and 1B, the only fiducial markers having the same angular barcode sections are the panel-identification fiducial markers 108 in the corners of the first panel 102 and the second panel 104. This is so that the observation of any corner of the first panel 102 or the second panel 104 yields the same identity for the panel being observed.

In alternate embodiments, rather than using bits, decimal numbers ranging from one to ten could be represented at each location of the angular barcode section 114. For example, a different color could be used to represent each digit 0-9 (e.g., similar to resistor color-coding, black=0, brown=1, red=2, orange=3, yellow=4, green=5, blue=6, violet=7, grey=8, and white=9) and each section could represent a factor of ten. Thus, if an angular barcode section was broken into eight subsections, each represented with one of the above colors, there would be $10^8$ possible combinations.

In alternate embodiments, where there are more or fewer than eight bits, the angular distribution of the angular barcode section 114 may be spaced differently (e.g., if there are 4 bits, rather than 8 bits, each bit may occupy roughly 90° of the angular barcode section rather than roughly 45° of the angular barcode section 114). Illustrated in FIGS. 1A-1C, the angular barcode sections 114 of the fiducial markers 110 are split into ten bits, rather than eight bits. As such, each bit may occupy about 36° of the angular barcode section.

Still further, in some embodiments (e.g., the embodiments of FIGS. 1A and 1B), certain angular barcodes may be reserved (e.g., 2, 3, 4, 5, 6, 7, 8, 9, 10, 11, 12, 13, 14, 15, 16, 17, 18, 19, 20, etc.) for inclusion in panel-identification fiducial markers 108. As illustrated in FIGS. 1A and 1B, the angular barcodes corresponding to "1" and to "2" may be used as the angular barcodes of panel-identification fiducial markers 108 for the first panel 102 and the second panel 104.

In some embodiments (e.g., embodiments that include a large number of uniquely identifiable fiducial markers), the angular barcode section may be replaced or supplemented by alternate forms of fiducial marker identification. For example, rather than one ring corresponding to an angular barcode section, there could be multiple rings of angular barcode sections. Additionally or alternatively, color could be used to identify the fiducial markers. As indicated above, color could be used to increase the areal density of the angular barcode sections (e.g., rather than using only black/white, using multiple colors to represent decimal numbers rather than binary numbers). Alternatively, other portions of the fiducial marker (e.g., the crosshairs, the human-readable label, or the fiducial bounding section) may be colored. For example, the crosshairs may be colored using paint or ink that reflects wavelengths in the visible range (e.g., wavelengths from about 400 nm to about 700 nm spaced in 1 nm increments) in order to add another identifier that can add uniqueness to each fiducial marker. In still other embodiments, a checkerboard pattern, rather than an angular barcode may be used to identify a panel. For example, if a fiducial marker were shaped as a rectangle or a square, one of the corners of the fiducial marker could be reserved for a checkerboard pattern (e.g., a four-by-four checkerboard where each position represents, using black or white, one of sixteen bits in the pattern). Such checkerboard patterns may be similar to Quick-Response (QR) codes used for identification. In still other embodiments, linear barcodes, rather than angular barcodes, may be used.

The fiducial bounding section 116 may identify the edge of the fiducial marker/define the region occupied by the fiducial marker. The fiducial bounding section 116 may also be used during calibration to identify whether or not a fiducial marker is actually present at a given location in a calibration image. For example, an image analysis program executed by a processor to analyze a calibration image may determine that a specific location of a calibration image appears to be crosshairs 112. However, in order to ensure that the section identified as crosshairs is actually crosshairs of a fiducial marker and not just noise or another artifact in the calibration image, the image analysis program executed by the processor may look for a fiducial bounding section surrounding the crosshairs. If a fiducial bounding section is surrounded by crosshairs, the chance of noise or other artifact obscuring the calibration results may be reduced.

In some embodiments, rather than identifying the crosshairs 112 first and then searching for a fiducial bounding section surrounding the crosshairs, an image analysis program executed by a processor may search first for the fiducial bounding section 116. Upon identifying the fiducial bounding section 116 (e.g., by identifying an ellipse in a calibration image), the image analysis program executed by the processor may look for the crosshairs 112 to determine a center of the respective fiducial marker. Alternatively, the image analysis program executed by the processor may determine a centerpoint of the ellipse that defines the fiducial bounding section 116 rather than looking for the crosshairs 112 in the calibration image.

The human-readable label 118 may be included in the fiducial markers 110 in some embodiments such that a human (e.g., a calibration engineer) can identify each of the fiducial markers 110, both on the panel/calibration target and within a captured or recorded calibration image. The human-readable label 118 may include one or more Arabic numerals, Roman numerals, letters, punctuation symbols, and/or other symbols or images, in various embodiments. In various embodiments, each of the human-readable labels 118 across a pattern, across an arrangement, across a panel, or across a calibration target may be unique (e.g., similar to the angular barcode section 114 of the fiducial marker 110). Further, in some embodiments, the human-readable label 118 of the fiducial markers 110 may correspond to the angular barcode sections 114 of the fiducial marker. For example, as illustrated in FIG. 1C, the Arabic numeral "1" may be used as a human-readable label 118 for a fiducial marker 110 that has the first angular barcode among a series of angular barcodes in the angular barcode section 114 of the fiducial marker 110. In some embodiments, there may be multiple human-readable labels for each fiducial marker or no human-readable labels for each fiducial marker. Further, in alternate embodiments, the human-readable label may be positioned differently than illustrated in FIG. 1C with respect to the rest of the fiducial marker (e.g., the human-readable label may be in a lower-left region of the fiducial marker, rather than in an upper-right region of the fiducial marker).

In some embodiments, portions of the calibration target may represent portions of or entire advertisements. For example, if a panel is a portion of billboard (e.g., near a highway used for automotive transit), the panel could be dual-purposed (e.g., the panel could be used for calibration of a camera equipped on an autonomous vehicle and to advertise to riders within the autonomous vehicle). In such cases, each fiducial marker may be an advertisement, or together, the first arrangement of fiducial markers may make up an advertisement (e.g., the first pattern or the first arrangement may spell out a slogan). Additionally or alternatively, portions of each of the fiducial markers themselves could be used for advertising. For example, a portion of the crosshairs of one or more fiducial markers may include trade slogans, discounts, or other forms of advertising.

FIG. 1D is an additional illustration of the first panel 102 and the second panel 104 with fiducial markers thereon. FIG. 1D shows the multiple patterns of fiducial markers 110, as illustrated in FIGS. 1A and 1B, in the first arrangement on the first panel 102 and the second arrangement in the second panel 104. As illustrated, FIG. 1D also shows the panel-identification fiducial markers 108 in the corners of the first panel 102/second panel 104. The numbering (0-6) in FIG. 1D is meant to illustrate patterns made up of subsets of fiducial markers 110. The fiducial markers 110 having a "0" may be the panel-identification fiducial markers 108. The fiducial markers 110 having a "1" may be in a first pattern of the first arrangement of the first panel 102 or in a third pattern of the second arrangement of the second panel 104. Similarly, the fiducial markers 110 having a "2" may be in a second pattern of the first arrangement of the first panel 102 or in a fourth pattern of the second arrangement of the second panel 104, and so on.

As illustrated, there may be six patterns of varying shapes and sizes per panel, plus a set of panel-identification fiducial markers 108. These patterns may be part of one or more arrangements (i.e., groups of patterns). It is understood that the naming convention "first pattern," "second pattern," "third pattern," etc. is used only for identification, and that various embodiments may have various numbers of patterns identified in various ways. For example, in one embodiment the "second pattern" may be in the same locations as the "sixth pattern" in a different embodiment.

FIGS. 1E and 1F illustrate part of a calibration process using an alternative calibration target 152. One way to calibrate a camera (e.g., an image sensor with an associated lens) includes using the pinhole camera approximation model. In order to do this, a series of calibration images of a calibration target can be captured or recorded. The calibration target may have calibration markers (e.g., fiducials) thereon. The calibration markers may be spaced evenly or unevenly across the calibration target. Either way, the location of the calibration markers on the calibration target may be known a priori to the calibration. Because the location of the calibration markers on the calibration target is known, any deviation from those locations in the resulting captured or recorded calibration images can be identified. These identified deviations may then be corrected or accounted for when using the camera (i.e., the camera may be "calibrated").

In order to determine a camera matrix associated with a camera that is to be calibrated, a series of calibration images of the calibration target may be captured or recorded from different perspectives. For example, as illustrated in FIGS. 1E and 1F, a first calibration image may be captured or recorded from a first camera depth 162 (e.g., depth measured along a z-axis) relative to a calibration target 152, and then the camera may be moved (or the target may be moved) to a second camera depth 164 relative to the calibration target 152 and a second calibration image captured or recorded. In this way, two different camera depths relative to the calibration target may be used (e.g., in the determination of the camera matrix).

Figure 1G:
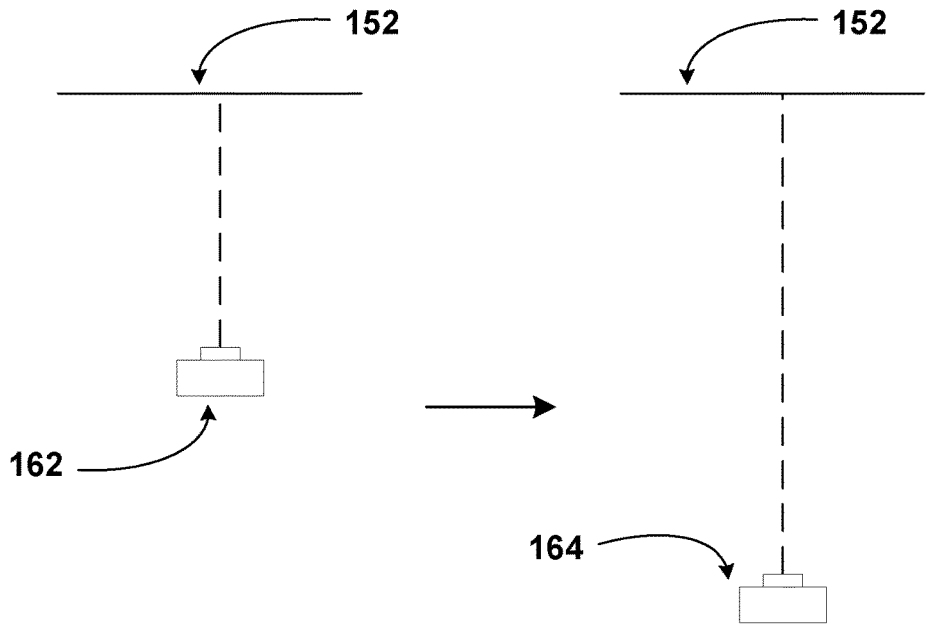
FIG. 1G is an illustration of a calibration process, according to example embodiments.
Figure 1G:
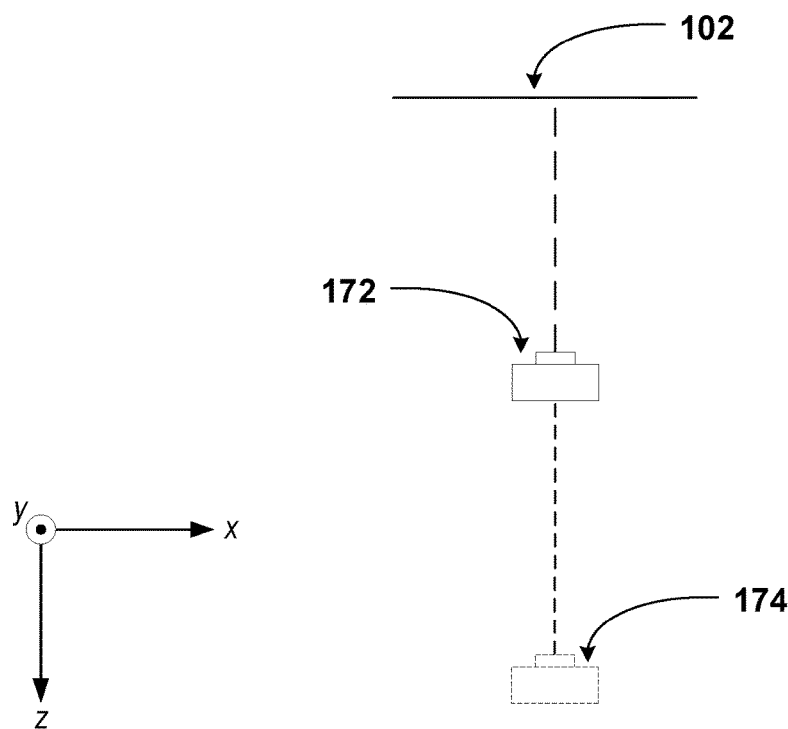

Illustrated in FIG. 1G is a portion of a calibration method using the first panel 102 illustrated in FIG. 1A. It is understood that the principle illustrated here equally applies if using the second panel 104 illustrated in FIG. 1B. In FIG. 1G, a single calibration image of the first panel 102 may be recorded from a first calibration depth 172. The first calibration depth 172 may be set such that the first panel 102 is a distance away from the camera equal to the focal distance (e.g., the distance away from the camera at which an object is most in focus). In some embodiments where the focal distance of the camera may be so large that such a distance is not practical (e.g., when the focal distance is 50 meters or more), the first calibration depth 172 may be set such that the first panel is closer to the camera than the focal distance of the camera (e.g., based on the focal length of a lens of the camera and/or based on a distance between the lens and an image sensor of the camera). In such embodiments however, in order to compensate for potential effects of the fiducial markers being out of focus in a calibration image, the first panel may be fabricated with larger fiducial markers (e.g., so they are detectable/distinguishable even when out of focus). The technique of designing a calibration target with larger fiducial markers to account for focal distance can be used with many embodiments of the calibration target described herein (i.e., not only a single panel embodiment).

As illustrated in FIG. 1D, the first panel 102 may include a series of patterns. The patterns may be of various sizes and shapes. For example, a first pattern (e.g., the fiducial markers 110 labeled with a "1") illustrated in FIG. 1D is a large rectangular pattern, while a second pattern (e.g., the fiducial markers 110 labeled with a "5") may be the same shape as the first pattern, but may be a different size. In the embodiment of FIG. 1D, such a second pattern is a scaled version of the first pattern (e.g., the rectangular shape is the same, but the perimeter and area of the rectangle are both scaled down). Further, the size of the fiducial markers 110 and the number of fiducial markers 110 (e.g., twelve) are the same in each of the two patterns. In alternate embodiments, the size of the fiducial markers and the number of fiducial markers among patterns may be changed.

Because there are repeated patterns of fiducial markers 110 on the first panel 102 that have different scales, a calibration image captured or recorded at the first calibration depth 172 can be used to mimic (i.e., simulate) multiple calibration images captured or recorded at multiple calibration depths. For example, a portion of the calibration image that includes the larger pattern on the first panel 102 (e.g., the first pattern labeled with "1" in FIG. 1D) can be used as a calibration image captured or recorded at the first calibration depth 172. In addition, a portion of the calibration image that includes the smaller pattern of the first panel 102 (e.g., the second pattern labeled with "5" in FIG. 1D) can be used as if it were a calibration image captured or recorded at a second calibration depth 174. This eliminates the need to actually capture or record an additional calibration image from the second calibration depth 174. Such a phenomenon may have many benefits over the calibration method illustrated in FIGS. 1E and 1F. For example, the time required for calibration may be reduced (both in terms of capturing or recording calibration images and computation), the cost of the calibration may be reduced, the amount of memory used for storing calibration images may be reduced, and the physical space used for the calibration may be reduced.

In some embodiments, only a portion of a calibration image may be analyzed in order to perform calibration. For example, in embodiments where four panel-identification fiducial markers are at corners of a panel, such as in the panels illustrated in FIGS. 1A and 1B, the four panel-identification fiducial markers may bound all other fiducial markers (e.g., other fiducial markers on the panel are disposed in between the four panel-identification fiducial markers). As such, any portion of a calibration image that lies outside of the four panel-identification fiducial markers may be disregarded during image analysis. Such a technique may save computational resources and reduce calibration time.

Figure 2A:
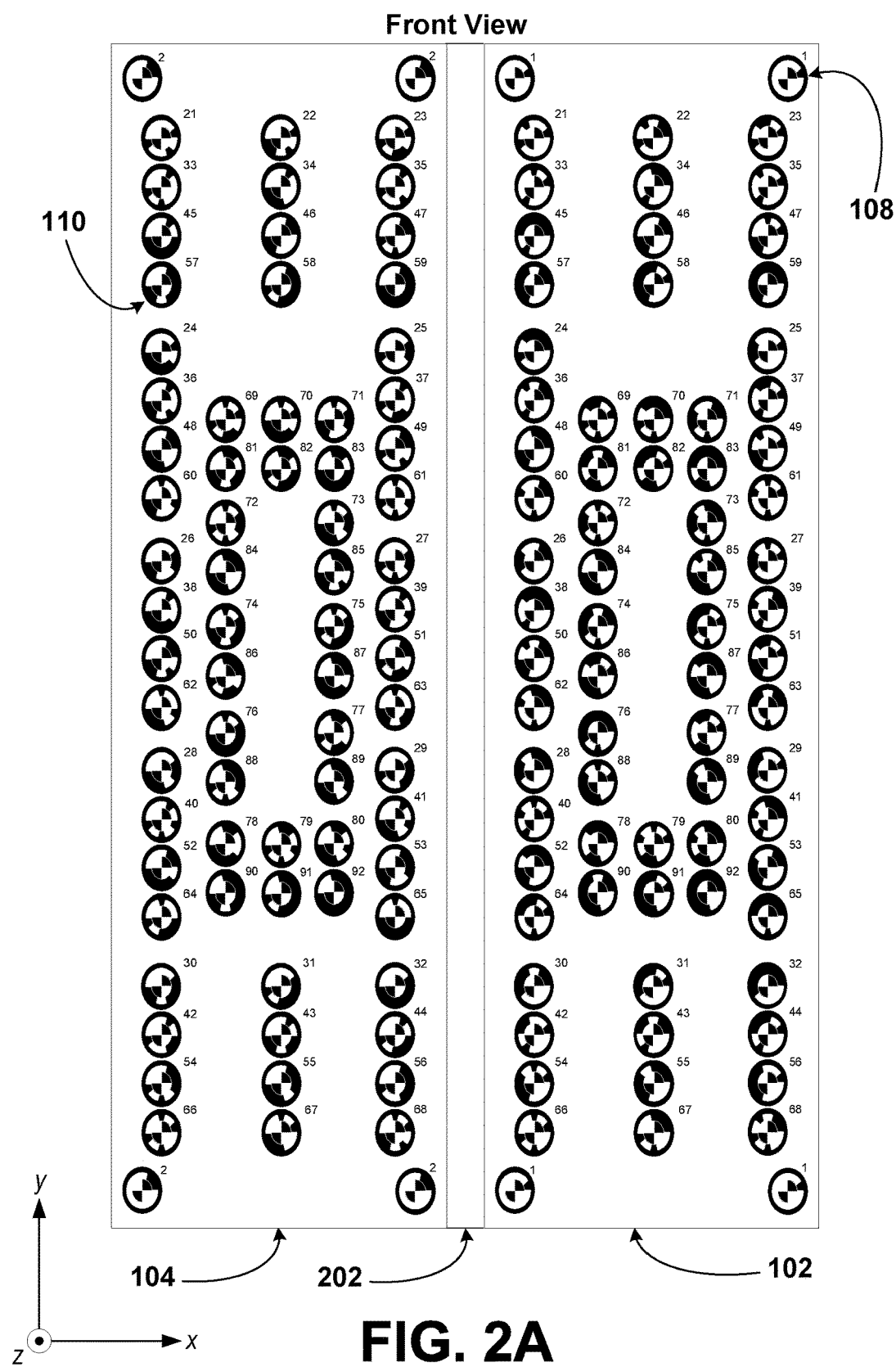
FIG. 2A is a front-view illustration of a calibration target, according to example embodiments.

FIG. 2A illustrates, in a front view perspective (e.g., perspective parallel to the x-y plane), a calibration target used to calibrate one or more cameras (e.g., one or more cameras used for navigation of autonomous vehicles). The calibration target may include the first panel 102, the second panel 104, and a connecting piece 202. As with above, only one of the fiducial markers 110 in FIG. 2A is labeled in order to avoid clutter on the figure. As illustrated, similar to as illustrated in FIGS. 1A and 1B, the first arrangement of fiducial markers 110 on the first panel 102 and the second arrangement of fiducial markers 110 the second panel 104 may be the same as one another. This may include one or more patterns of fiducial markers 110 within the first arrangement matching one or more patterns of fiducial markers 110 within the second arrangement. Matching may include the patterns and/or the arrangements having similar or identical spatial arrangements, sizes, and/or orientations, in various embodiments.

Also as illustrated in FIGS. 1A and 1B, the fiducial markers 110 themselves are similar in the first panel 102 and the second panel 104, but not identical. One primary difference is the panel-identification fiducial markers 108 on the first panel 102 and the second panel 104. As illustrated, the panel-identification fiducial markers 108 on the first panel 102 and the second panel 104 are in matching positions on the respective panels, but they are not the same fiducial markers. Notably, the human-readable labels are different (e.g., a "1" on the first panel 102 and a "2" on the second panel 104). Further, the angular barcode section 114 of the panel-identification fiducial markers 108 on the two panels is different. Another difference between the first panel 102 and the second panel 104 is that the fiducial markers in the second arrangement on the second panel 104 have angular barcode sections 114 that are 180° rotations of the corresponding angular barcode sections 114 in the fiducial markers 110 in the first arrangement on the first panel 102. In some embodiments, however, the fiducial markers on the first panel 102 and the second panel 104 may be identical, with the exception of the panel-identification fiducial markers 108.

In even further embodiments, the panels of the calibration target may not include panel-identification fiducial markers. Still further, in such embodiments without panel-identification fiducial markers, the fiducial markers on the panels may be exactly duplicated (e.g., the fiducial markers on multiple panels may be in the same arrangements and patterns on all panels). Because a calibration method used on the calibration target may be based on known arrangements of fiducial markers on the panels, the location of each fiducial marker relative to the rest of an arrangement is known (e.g., based on its angular barcode). Further, if repeated copies of a given fiducial marker appear in a calibration image, a calibration method may account for this by recognizing that multiple arrangements of fiducial markers are present in the calibration image. If multiple arrangements of fiducial markers are present in the calibration image, and the location of each fiducial marker within a given arrangement is known, errors regarding which arrangement a given fiducial marker is in can be avoided.

In other embodiments, if repeated copies of a given fiducial marker appears in a calibration image, a calibration method may include determining that there are multiple arrangements present within the calibration image. Further, the spatial relationship between the multiple arrangements may be determined (e.g., determining which pattern is leftmost, rightmost, bottommost, topmost, second from the left, second from the right, second from the bottom, second from the top, etc.). Using the spatial relationship, a calibration method may include determining that one of the duplicate fiducial markers came from a pattern whose location is known (e.g., if there are two copies of the same fiducial marker within a calibration image, and one is located to the left of the other, based on the spatial relationship between associated arrangements, it may be determined that the fiducial marker located to the left is associated with the leftmost arrangement, wherein the other fiducial marker is associated with the rightmost arrangement). Based on this determination, errors regarding which arrangement a given fiducial marker is in can be avoided.

The calibration target illustrated in FIG. 2A may be used to calibrate cameras at a fabrication facility. For example, an image sensor and/or a lens may be calibrated using the calibration target after fabrication is complete (e.g., calibrated using a pinhole camera model). Additionally or alternatively, the calibration target may be used to calibrate one or more cameras upon assembly or installation. For example, when an image sensor and a lens are together assembled within a housing to form a digital camera (e.g., in a laptop computer or a mobile phone), the digital camera assembly may be calibrated. In still other embodiments, the calibration target may be used to calibrate a camera while in use. For example, if a camera is being used for navigation on an autonomous vehicle, the calibration target may be positioned at an exit of a garage, on a billboard, or on the road surface itself, such that while the autonomous vehicle is in motion calibration can be performed. Such a calibration may include a validation to a previously calibrated state (i.e., a "check-up" calibration). If the camera fails such a validation, the camera and/or the entire autonomous vehicle may be decommissioned permanently or temporarily (e.g., until repair is performed). If the camera is decommissioned, a redundant backup camera may be employed.

The first panel 102 and the second panel 104 may be fabricated out of a variety of materials. The fiducial markers 110 may be printed on the first panel 102 and the second panel 104. The connecting piece 202 may be used to attach the first panel 102 to the second panel 104. For example, the connecting piece 202 may be welded to both the first panel 102 and the second panel 104. As described further with respect to FIG. 2B, the connected piece 202 may hold the first panel 102 and the second panel 104 at an angle relative to each other.

In alternate embodiments, the first panel 102 and the second panel 104 may be directly connected to one another without using a connecting piece. Further, in some embodiments, rather than using the entire calibration target to calibrate a camera, only the first panel 102 or the second panel 104 may be used to calibrate a camera.

Figure 2B:
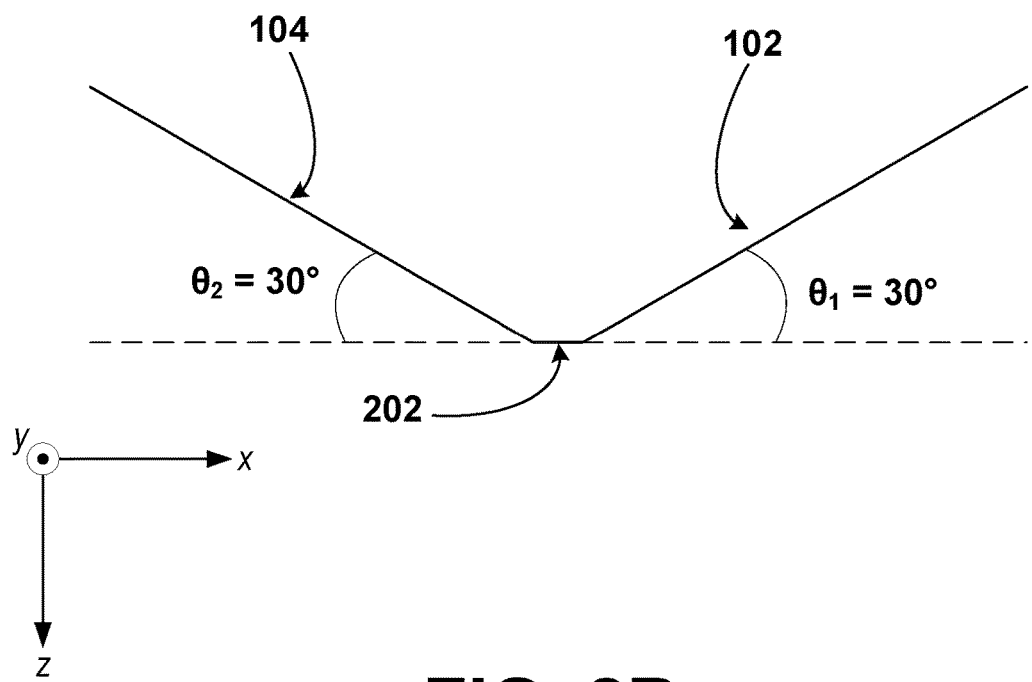
FIG. 2B is a top-view illustration of a calibration target, according to example embodiments.

FIG. 2B is a top-view illustration (e.g., perspective parallel to the x-z plane) of the calibration target in FIG. 2A. As illustrated, the connecting piece 202 connects the first panel 102 and the second panel 104 such that both are at 30° angles with respect to the connecting piece 202. The dashed line is used to illustrate a line that is collinear with the connecting piece 202. In alternate embodiments, different angles may be used (e.g., about 1°, about 2°, about 3°, about 4°, about 5°, about 10°, about 15°, about 20°, about 25°, about 35°, about 40°, about 45°, about 50°, about 55°, about 60°, about 65°, about 70°, about 75°, about 80°, about 85°, or about 90°). A 45° angle may provide the most variability between camera perspectives (i.e., the difference in the appearance of the panels when moving relative to the calibration target may be largest when the panels are at a 45° angle relative to the connecting piece 202. In other embodiments, the connecting piece itself may be bent to form an angle between the first panel and the second panel. Still further, in some embodiments, the angle between the first panel and the connecting piece may not be the same as the angle between the second panel and the connecting piece (i.e., $\theta_1 \neq \theta_2$).

In some embodiments, the camera undergoing calibration may be positioned at a distance (e.g., in the z-direction) away from the calibration target that is equal to the focal distance of the camera. For example, if the focal distance is 2 meters, calibration images of the calibration target may be captured or recorded at a perspective from the calibration target that is 2 meters away (e.g., in the z-direction). Additionally or alternatively, the camera undergoing calibration may be positioned at a distance (in the z-direction) relative to the calibration target, and/or the calibration target may be sized, such that the calibration target fills an entire field of view for the camera.

In addition, the calibration target may be a part of a calibration system (e.g., used to calibrate a camera). The calibration system may also include a stage that is used to translate (e.g., stepwise) and/or rotate (e.g., stepwise) a camera relative to the calibration target (e.g., to capture or record multiple calibration images from multiple camera perspectives). The stage may be controlled by a processor of a computing device that executes a set of instructions to step the stage from one camera perspective to the next relative to the calibration target. The camera may capture or record calibration images between or during each step (e.g., as controlled by the processor).

Figure 2C:
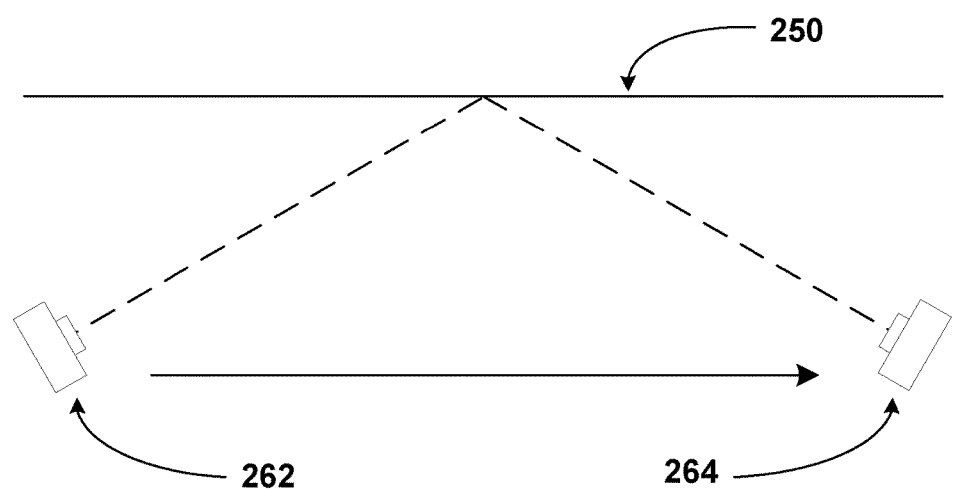
FIG. 2C is an illustration of a calibration process.

FIG. 2C illustrates part of a calibration using an alternative calibration target 250. As described with reference to FIGS. 1E and 1F, in order to determine a camera matrix associated with a camera, a series of calibration images of the calibration target may be captured or recorded from different perspectives. For example, as illustrated in FIG. 2C, a first calibration image may be captured or recorded from a first angular perspective 262 (e.g., about the y-axis) relative to a calibration target 250, and then the camera may be moved (or the target may be moved) to a second angular perspective 264 relative to the calibration target 250 and a second calibration image captured or recorded. In this way, two different camera angles relative to the calibration target 250 may be used (e.g., in the determination of the camera matrix).

Figure 2D:
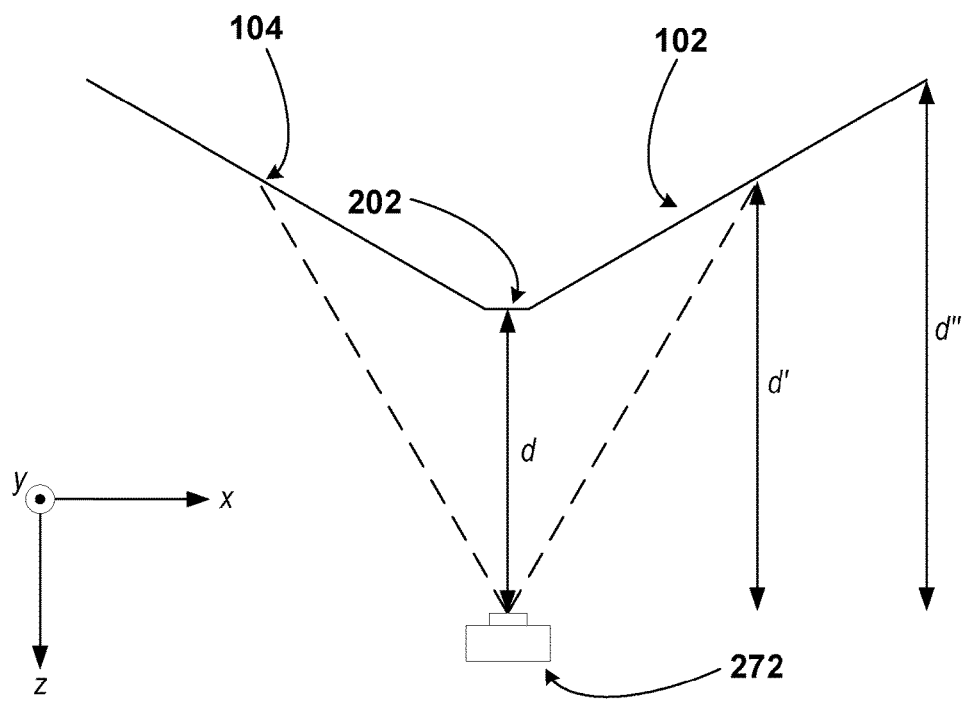
FIG. 2D is an illustration of a calibration process, according to example embodiments.

Illustrated in FIG. 2D is a portion of a calibration method using the calibration target illustrated in FIGS. 2A and 2B. In FIG. 2D, a calibration image of the calibration target may be captured or recorded from a single calibration position 272. As illustrated, the calibration position 272 may be aligned with the connecting piece 202 (e.g., the calibration position 272 may be parallel to the connecting piece 202, in terms of rotation, and the aperture of the camera may be roughly horizontally aligned, e.g., in the x-direction, with the connecting piece 202). Further, the calibration position 202 may be at a depth (e.g., in the z-direction), d, relative to the calibration target. In some embodiments, the depth may instead be defined as the distance (e.g., along the z-direction) from the camera to the horizontal center of the panel, d', or as the distance (e.g., along the z-direction) from the camera to the horizontal edge of the panel, d". Additionally or alternatively, the calibration position 202 may be set such that the depth d is equal to the focal distance of a lens on the camera being calibrated. As illustrated, the first panel 102 and the second panel 104 may be disposed at an angle with respect to the connecting piece 202 (e.g., a 30° angle).

Because the panels are at an angle with respect to one another, a calibration image captured or recorded at the calibration position 272 can be used to mimic (e.g., simulate) multiple calibration images captured or recorded at multiple calibration angles of a planar calibration target (e.g., can be used to simulate two calibration images taken of the calibration target 250; one from the first angular perspective 262 and one from the second angular perspective 264). In some embodiments, in order to use the calibration image captured or recorded from the calibration position 272 to simulate calibration images from two angles (e.g., the first angular perspective 262 and the second angular perspective 264), a calibration image captured or recorded from the calibration position 272 may be cropped. For example, the left half of the image may be used to mimic a calibration image of the calibration target 250 taken from the second angular perspective 264 and the right half of the image may be used to mimic a calibration image of the calibration target 250 taken from the first angular perspective 262.

This may eliminate the need to actually capture or record calibration images from multiple angles. Such a phenomenon may have many benefits over the multiple-location calibration method illustrated in FIG. 2C. For example, the time required for calibration may be reduced (both in terms of capturing or recording calibration images and computation), the cost of the calibration may be reduced, the amount of memory used for storing calibration images may be reduced, and the physical space used for the calibration may be reduced.

Because the first panel 102 and the second panel 104 may have scaled patterns of fiducial markers 110, it is also understood that the feature of having a calibration target that enables multiple depths to be simulated (e.g., as illustrated in FIG. 1G) in a single calibration image may also be present in the embodiment of FIG. 2D. Thus, at least two angles can be simulated and at least two depths can be simulated using the calibration target and calibration arrangement of in FIG. 2D. Hence, at minimum, one calibration image can simulate at least four calibration images, each taken from a different calibration location, of a planar calibration target that does not employ fiducial marker scaling. In alternate embodiments, where additional scaling and/or angles of panels are used, even more calibration locations may be simulated. This is further described with reference to FIGS. 4A and 4B.

Figure 3A:
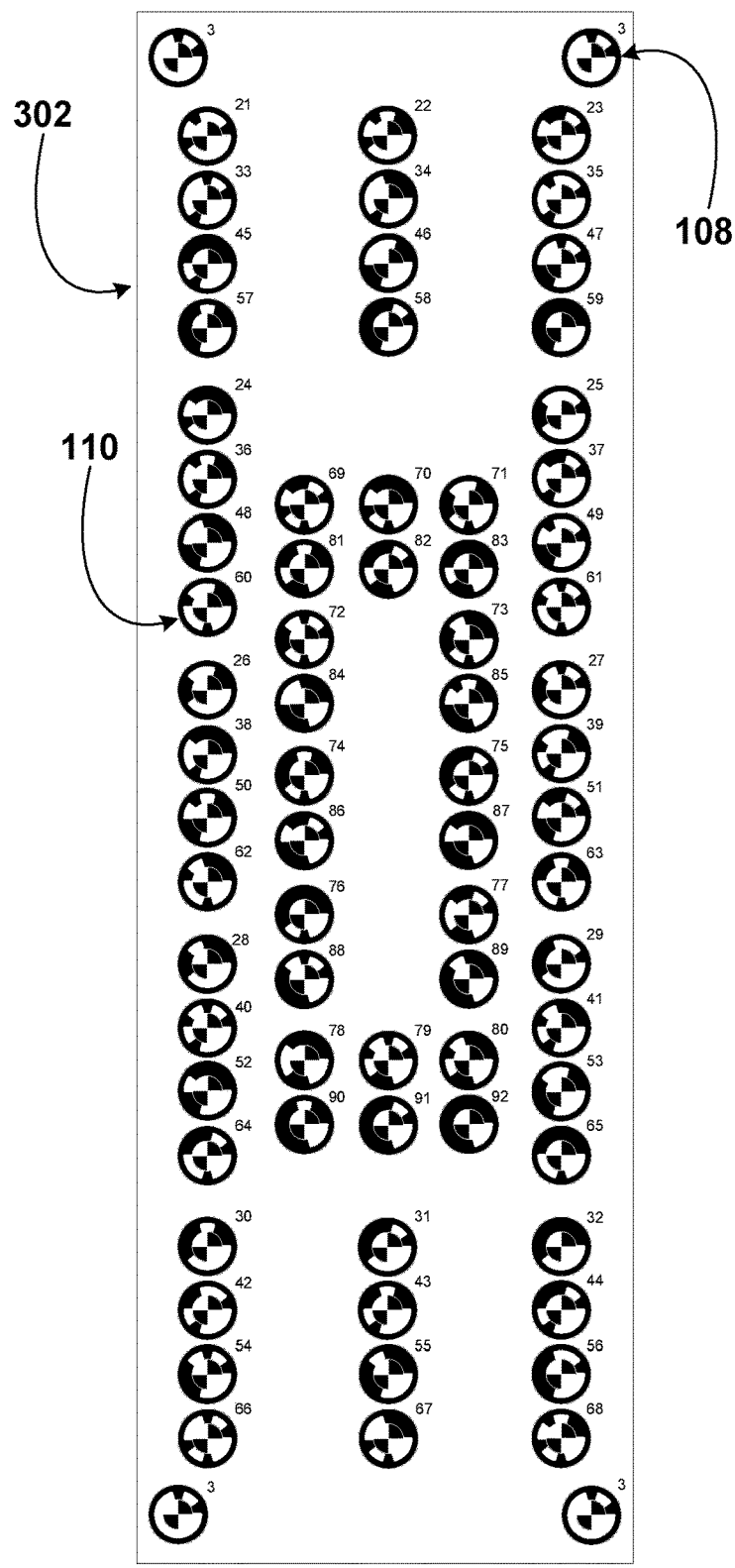
FIG. 3A is an illustration of a panel of a calibration target, according to example embodiments.

Illustrated in FIG. 3A is a third panel 302 of a calibration target. The third panel 302 may be a portion of the same calibration target as the first panel 102 and the second panel 104. Similar to the first panel 102 and the second panel 104, the third panel 302 may include a series of fiducial markers 110 arranged thereon. Again, only one of the fiducial markers 110 is labeled to avoid cluttering the figure. Like the first panel 102 and the second panel 104, a subset of the fiducial markers 110 may be used as third-panel-identification fiducial markers 108. For example, the fiducial markers 110 nearest to the corners of the third panel 302 may indicate the identity of the third panel 302. As illustrated, the fiducial markers 110 on the third panel 302, with the exception of the third-panel-identification fiducial markers 108 in the corners of the third panel 302, may match the fiducial markers 110 of the first panel 102 (as illustrated in FIG. 1A) and may be 180° rotations of the fiducial markers 110 of the second panel 104 (as illustrated in FIG. 1B).

As with the first panel 102 and the second panel 104, another subset of the fiducial markers 110 on the third panel 302 (e.g., all of the fiducial markers 110 other than the third-panel-identification fiducial markers 108) may be in a third arrangement of fiducial markers 110. The third arrangement of fiducial markers 110 may include multiple patterns of fiducial markers 110. For example, the third arrangement of fiducial markers 110 may include at least a fifth pattern of fiducial markers 110 and a sixth pattern of fiducial markers 110. The sixth pattern of fiducial markers 110 may be a scaled version of the fifth pattern of fiducial markers 110. In various embodiments, there may be various patterns on the third panel 302. This will be described further with reference to FIGS. 6A-6E.

Figure 3B:
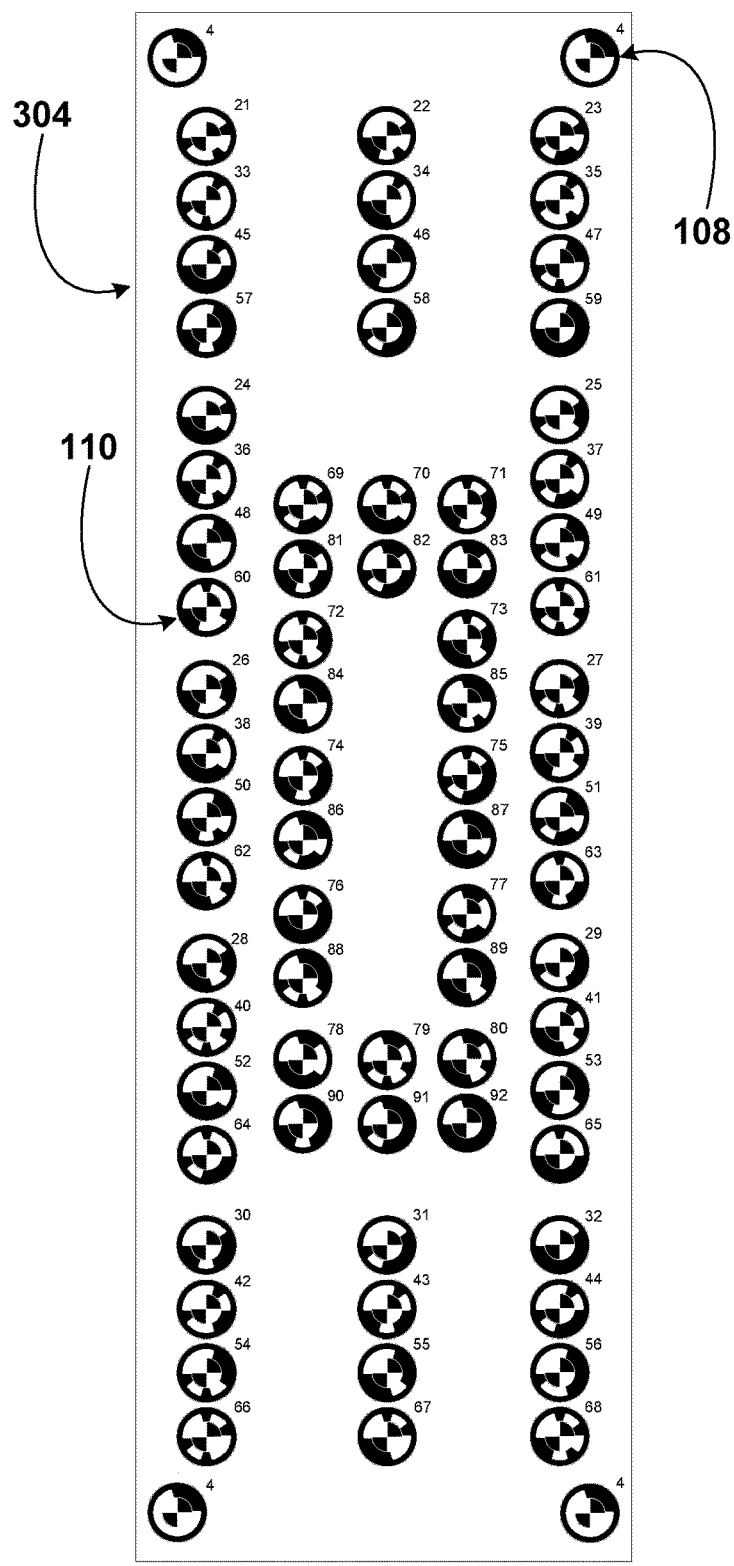
FIG. 3B is an illustration of a panel of a calibration target, according to example embodiments.

Illustrated in FIG. 3B is a fourth panel 304 of a calibration target. The fourth panel 304 may be a portion of the same calibration target as the first panel 102, the second panel 104, and the third panel 302. Similar to the first panel 102, the second panel 104, and the third panel 302, the fourth panel 304 may include a series of fiducial markers 110 arranged thereon. Again, only one of the fiducial markers 110 is labeled to avoid cluttering the figure. Like the first panel 102, the second panel 104, and the third panel 302, a subset of the fiducial markers 110 may be used as fourth-panel-identification fiducial markers 108. For example, the fiducial markers 110 nearest to the corners of the fourth panel 304 may indicate the identity of the fourth panel 304. As illustrated, the fiducial markers 110 on the fourth panel 304, with the exception of the fourth-panel-identification fiducial markers 108 in the corners of the fourth panel 304, may match the fiducial markers 110 of the second panel 104 (as illustrated in FIG. 1B) and may be 180° rotations of the fiducial markers 110 of the first panel 102 (as illustrated in FIG. 1A) and the third panel 302 (as illustrated in FIG. 3A).

As with the first panel 102, the second panel 104, and the third panel 302, another subset of the fiducial markers 110 on the fourth panel 304 (e.g., all of the fiducial markers 110 other than the fourth-panel-identification fiducial markers 108) may be in a fourth arrangement of fiducial markers 110. The fourth arrangement of fiducial markers 110 may include multiple patterns of fiducial markers 110. For example, the fourth arrangement of fiducial markers 110 may include at least a seventh pattern of fiducial markers 110 and an eighth pattern of fiducial markers 110. The eighth pattern of fiducial markers 110 may be a scaled version of the seventh pattern of fiducial markers 110. In various embodiments, there may be various patterns on the fourth panel 304. This will be described further with reference to FIGS. 6A-6E.

Figure 4A:
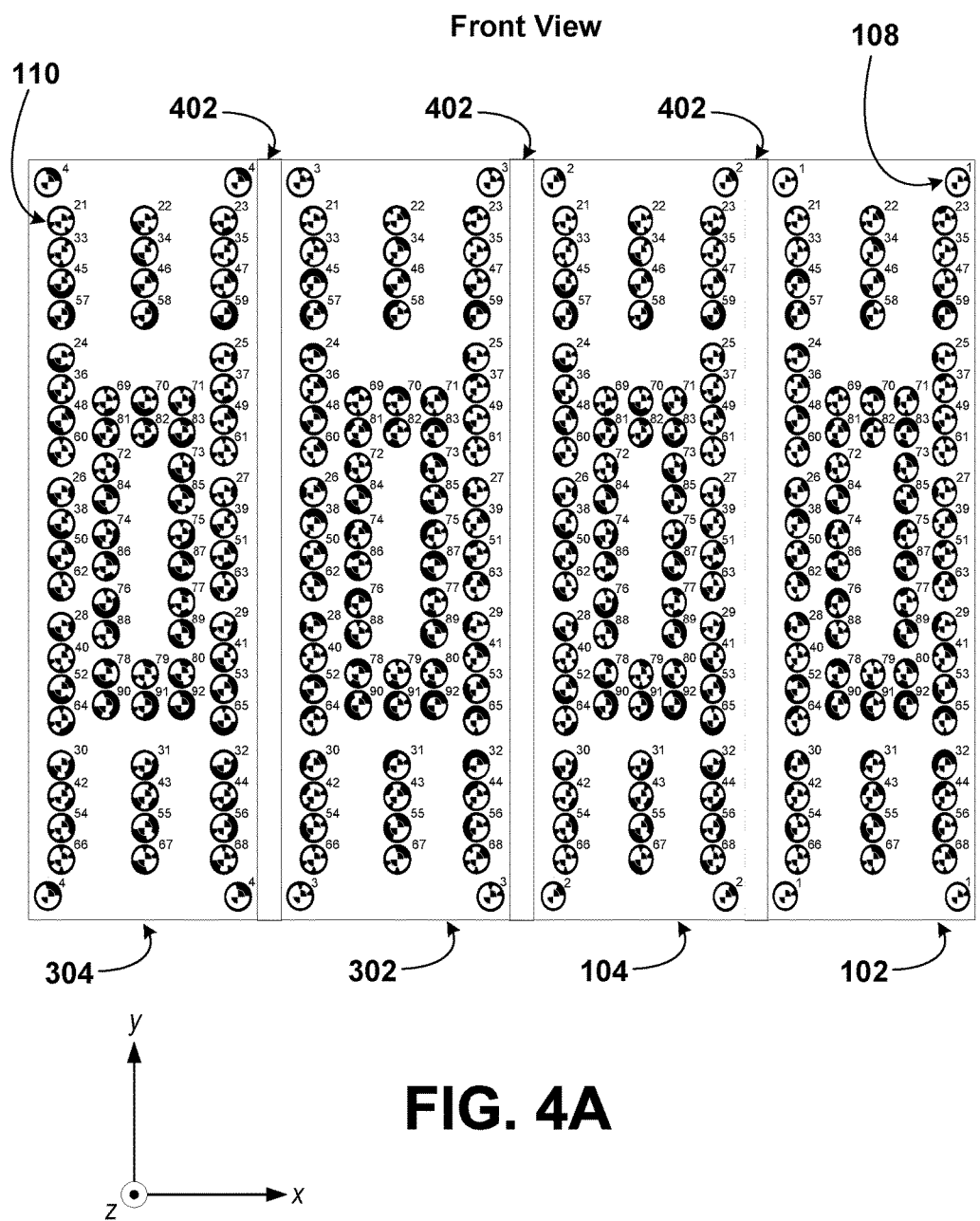
FIG. 4A is a front-view illustration of a calibration target, according to example embodiments.

Similar to FIG. 2A, FIG. 4A illustrates, in a front-view perspective (e.g., perspective parallel to the x-y plane), a calibration target used to calibrate one or more cameras (e.g., one or more cameras used for navigation of autonomous vehicles). The calibration target may include the first panel 102, the second panel 104, the third panel 302, the fourth panel 304, and multiple connecting pieces 402. As with above, only one of the fiducial markers 110 in FIG. 4A is labeled in order to avoid cluttering the figure. As illustrated, similar to as illustrated in FIG. 2A, the third arrangement of fiducial markers 110 on the third panel 302 and the fourth arrangement of fiducial markers 110 on the second panel 104 may be the same as one another. This may include one or more patterns of fiducial markers 110 within the third arrangement matching one or more patterns of fiducial markers 110 within the fourth arrangement.

Similar to the calibration target illustrated in FIG. 2A, the calibration target illustrated in FIG. 4A may be used to calibrate cameras at a fabrication facility. Additionally or alternatively, the calibration target may be used to calibrate one or more cameras upon assembly or installation.

Figure 4B:
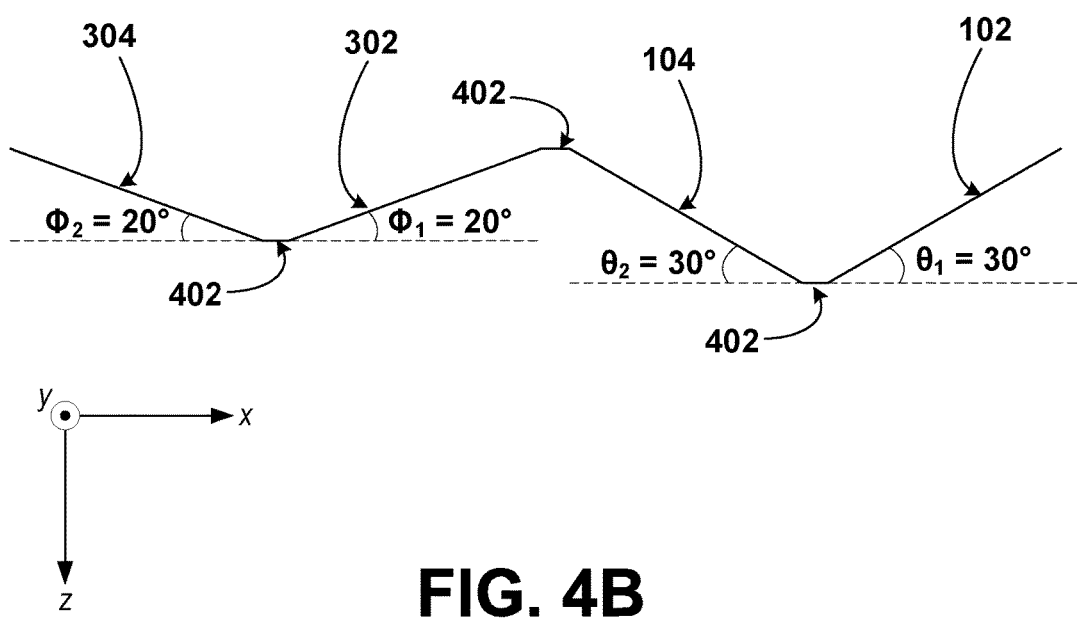
FIG. 4B is a top-view illustration of a calibration target, according to example embodiments.

FIG. 4B is a top-view illustration (e.g., perspective parallel to the x-z plane) of the calibration target in FIG. 4A. As illustrated, one of the connecting pieces 402 may connect the first panel 102 and the second panel 104 such that both are at 30° angles with respect to the connecting piece 402 (similar to the calibration target illustrated in FIG. 2B). Additionally, one of the connecting pieces 402 may connect the third panel 302 and the fourth panel 304 such that both are at 20° angles with respect to the connecting piece 402. Still further, another of the connecting pieces 402 may connect the first panel 102 and the second panel 104 to the third panel 302 and the fourth panel 304. The dashed lines are used to illustrate lines that are collinear with at least one the connecting pieces 404. In some embodiments, the dashed lines may be parallel to one another and/or parallel to the x-axis (as illustrated in FIG. 4B). In alternate embodiments, different angles may be used (e.g., about 1°, about 2°, about 3°, about 4°, about 5°, about 10°, about 15°, about 20°, about 25°, about 35°, about 40°, about 45°, about 50°, about 55°, about 60°, about 65°, about 70°, about 75°, about 80°, about 85°, or about 90°). A 45° angle may provide the most variability between perspectives (i.e., the difference in the appearance of the panels when moving relative to the calibration target may be largest when the panels are at a 45° angle relative to the connecting piece 202). In some embodiments, the connecting pieces 404 may themselves be angled to provide one or more angles between the four panels. Still further, in some embodiments, the angle between the first panel and the connecting piece may not be the same as the angle between the second panel and the connecting piece (i.e., $\theta_1 \neq \theta_2$) and/or the angle between the third panel and the connecting piece may not be the same as the angle between the fourth panel and the connecting piece (i.e., $\Phi_1 \neq \Phi_2$). In some embodiments, $\theta_1 = \Phi_1$, $\theta_2 = \Phi_2$, $\theta_1 = \Phi_2$, or $\theta_2 = \Phi_1$.

In some embodiments, the middle connecting piece 402, which connects the two pairs of panels, may connect the pairs of panels in such a way that they are at an angle with one another. Said another way, the dashed lines illustrated in FIG. 4B, in some embodiments, may not be parallel to one another. Having this additional angle between the two pairs of panels may allow for additional simulated calibration images from a single image (see description with respect to FIGS. 1E-1G and FIGS. 2C and 2D).

In alternate embodiments, rather than a center connecting piece connecting the pair of first and second panels with the pair of third and fourth panels, the two pairs of panels may be unconnected and independently positioned relative to one another. This may allow for the two pairs of panels to be at a variety of angles with respect to one another. Further, such an angle between the panels may be adjustable by moving one or both of the pairs of panels. Even further, in some embodiments, the two pairs of panels may be placed on opposite sides of the camera. In such embodiments, the camera may rotate to capture or record multiple calibration images so as to capture or record each of the two pairs of panels. Additionally or alternatively, the camera may include a wide-angle lens or a fisheye lens to capture all or portions of both pairs of panels from a single camera angle/position. In such embodiments, the wide-angle lens or fisheye lens may be an inherent component of the camera (e.g., rather than a lens added solely for calibration).

In some embodiments where the two pairs of panels (i.e., two subsections of the same calibration target) are positioned on opposite sides of the camera to be calibrated, the two pairs of panels may be different distances from the camera. During calibration, having panels at different distances from the camera may bound the focal distance relative to the camera (e.g., by including one set of panels located at a distance greater than the focal distance and one set of panels located at a distance less than the focal distance). In other embodiments, there may be more than two pairs of panels placed at varying angles and locations relative to the camera to be calibrated. In still other embodiments, rather than pairs of panels, a single panel or three or more panels may be used at one or more of the locations.

Figure 4C:
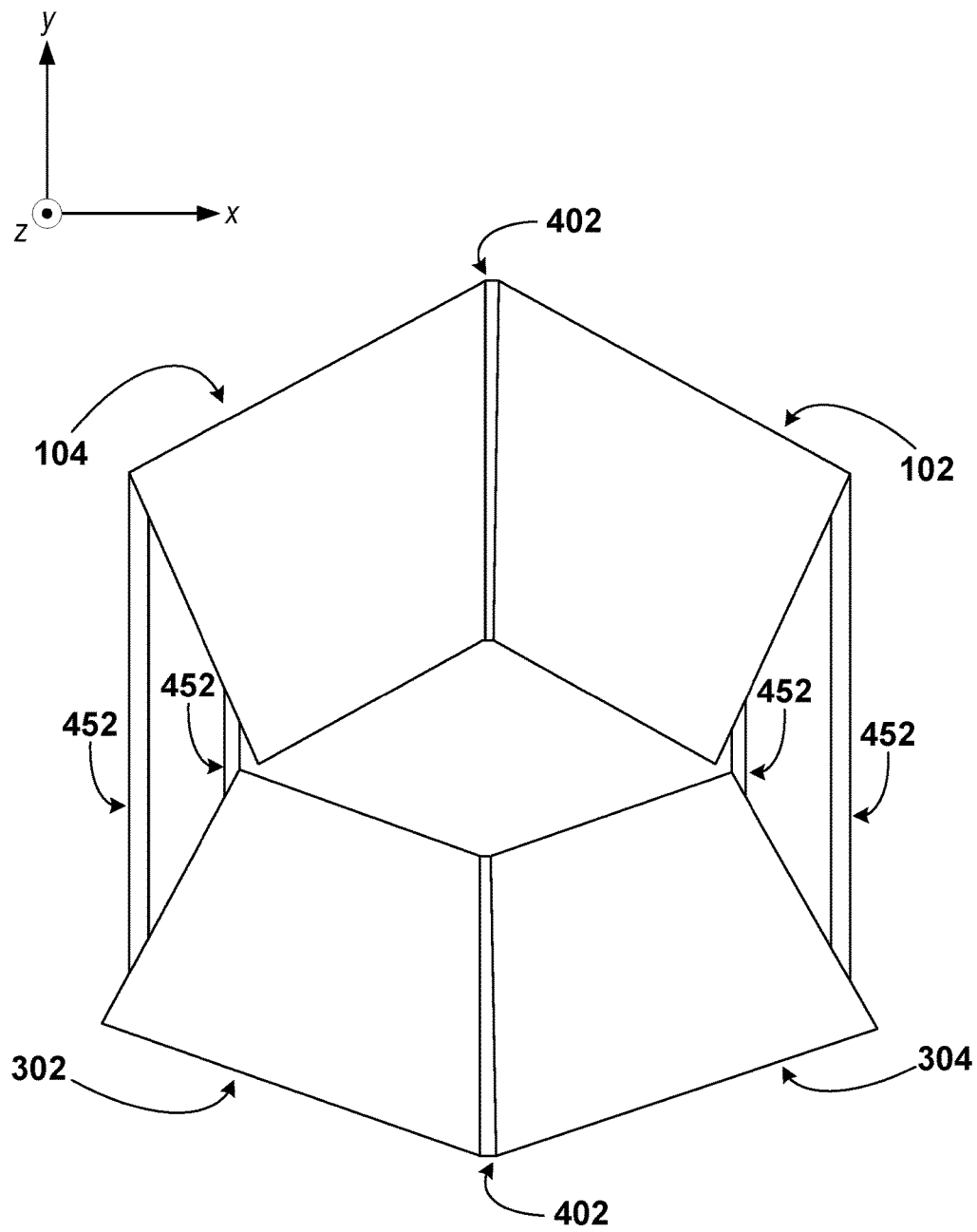
FIG. 4C is a front-view illustration of a calibration target, according to example embodiments.
Figure 4D:
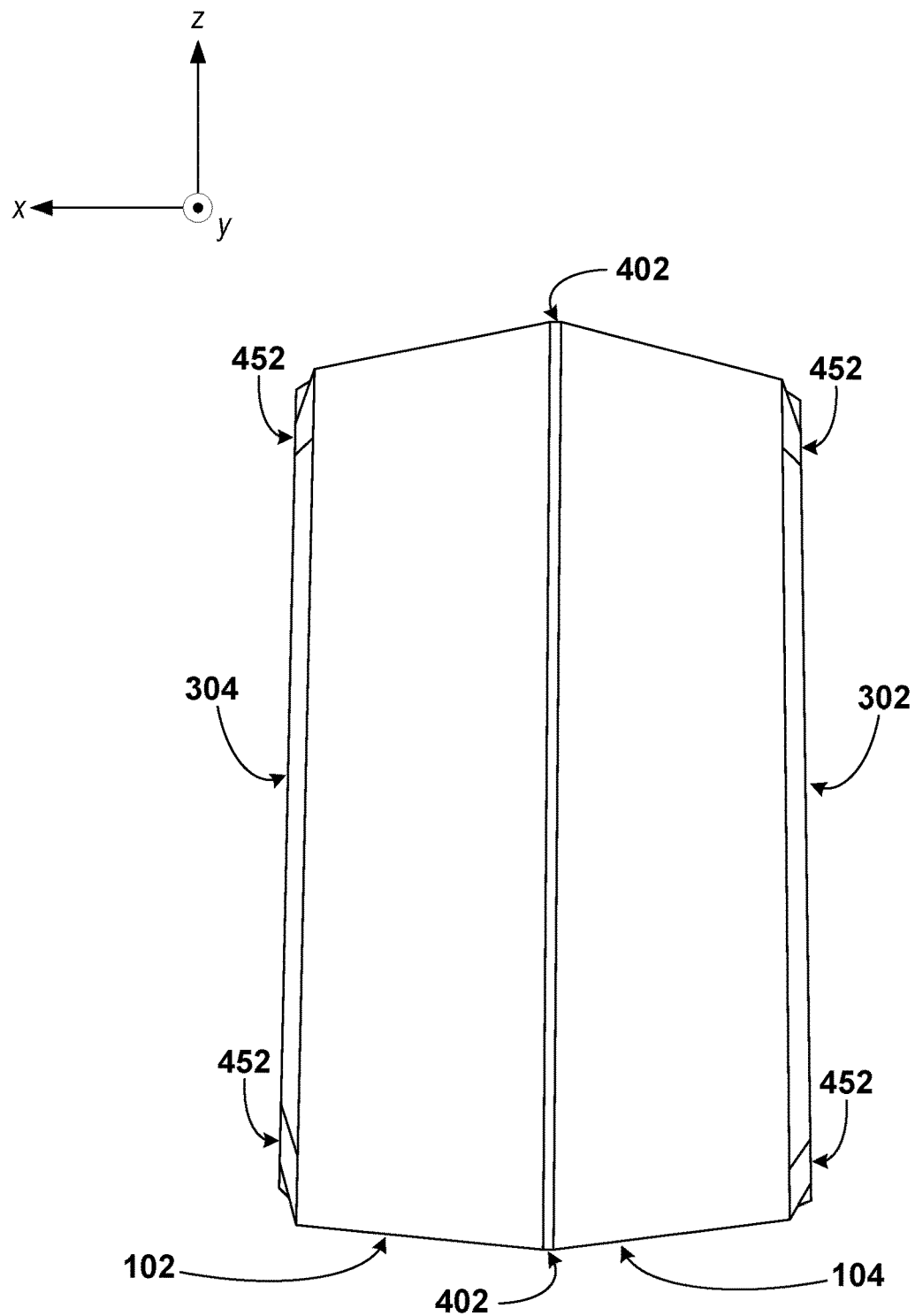
FIG. 4D is a top-view illustration of a calibration target, according to example embodiments.
Figure 4E:
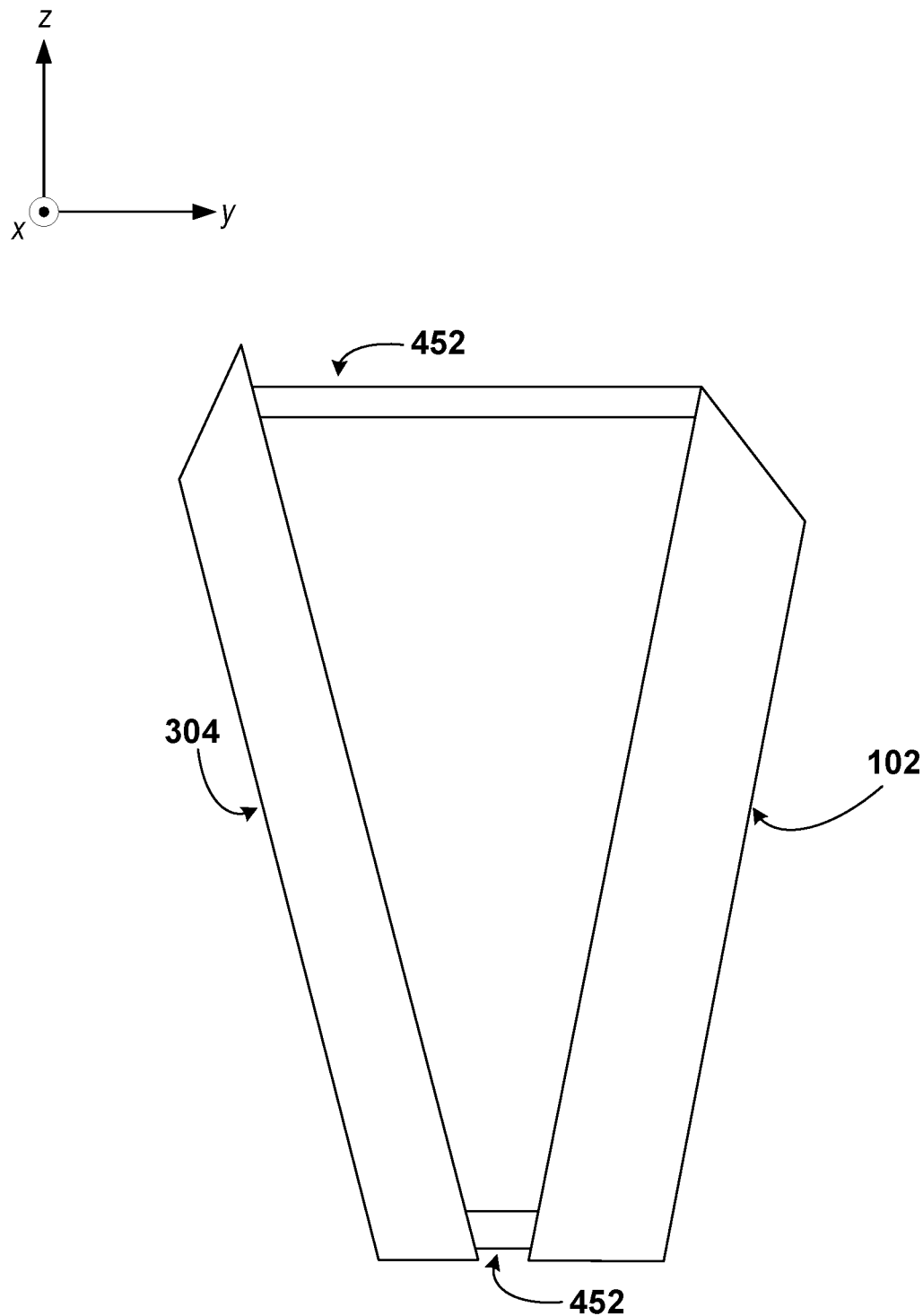
FIG. 4E is a side-view illustration of a calibration target, according to example embodiments.

As illustrated in FIGS. 4C-4E, in some embodiments the two pairs of panels may be arranged in an inverted pyramid orientation relative to the camera (e.g., where the base of the inverted pyramid is facing the camera, i.e., where the point of the pyramid is facing away from the camera). For example, one or both of the two pairs of panels may be rotated above a horizontal axis (e.g., the x-axis in FIGS. 4C-4E) in addition to a vertical axis (e.g., the z-axis in FIGS. 4C-4E). Such a horizontal-axis rotation may correspond to leaning one or both of the pairs of panels. As in FIGS. 4C-4E, a first pair of panels (e.g., the first panel 102, the second panel 104, and the connecting piece 402) may be joined to a second pair of panels (e.g., the third panel 302, the fourth panel 304, and the connecting piece 402) using one or more connecting pieces 452. FIG. 4C may illustrate a front-view of the two pairs of panels, FIG. 4D may illustrate a top-view (e.g., or a top-view rotated 180° relative to the front-view) of the two pairs of panels, and FIG. 4E may illustrate a side-view of the two pairs of panels.

The inverted pyramid structure for a calibration target, as illustrated in FIGS. 4C-4E, may allow four different angles. For example, the first panel 102 and the second panel 104 are at 30° angles relative to the connecting piece 402, the third panel 302 and the fourth panel 304 are at 20° angles relative to the connecting piece 402, the first pair of the first panel 102 and the second panel 104 are at a 10° angle, and the second pair of the third panel 302 and the fourth panel 304 are at a 15° angle. In other embodiments, other angles may be used. In still other embodiments, eight unique angles, rather than four unique angles, may be included (e.g., if the first panel 102, the second panel 104, the third panel 302, and the fourth panel 304 are all at different angles). The fact that more than two angles are included in the calibration target may allow for additional calibration images to be simulated using a single calibration image. In yet other embodiments, rather than multiple panels at angles with respect to one another (e.g., in an accordion style as illustrated in FIG. 4A), a panel may be shaped hemispherically. This may allow for a continuum of angles on a single panel relative to the camera. In some embodiments, a non-inverted (as opposed to an inverted) pyramid structure may be used for a calibration target. In still yet other embodiments, a panel may be shaped as a semi-sphere or a semi-cylinder (e.g., a half-cylinder).

Figure 5:
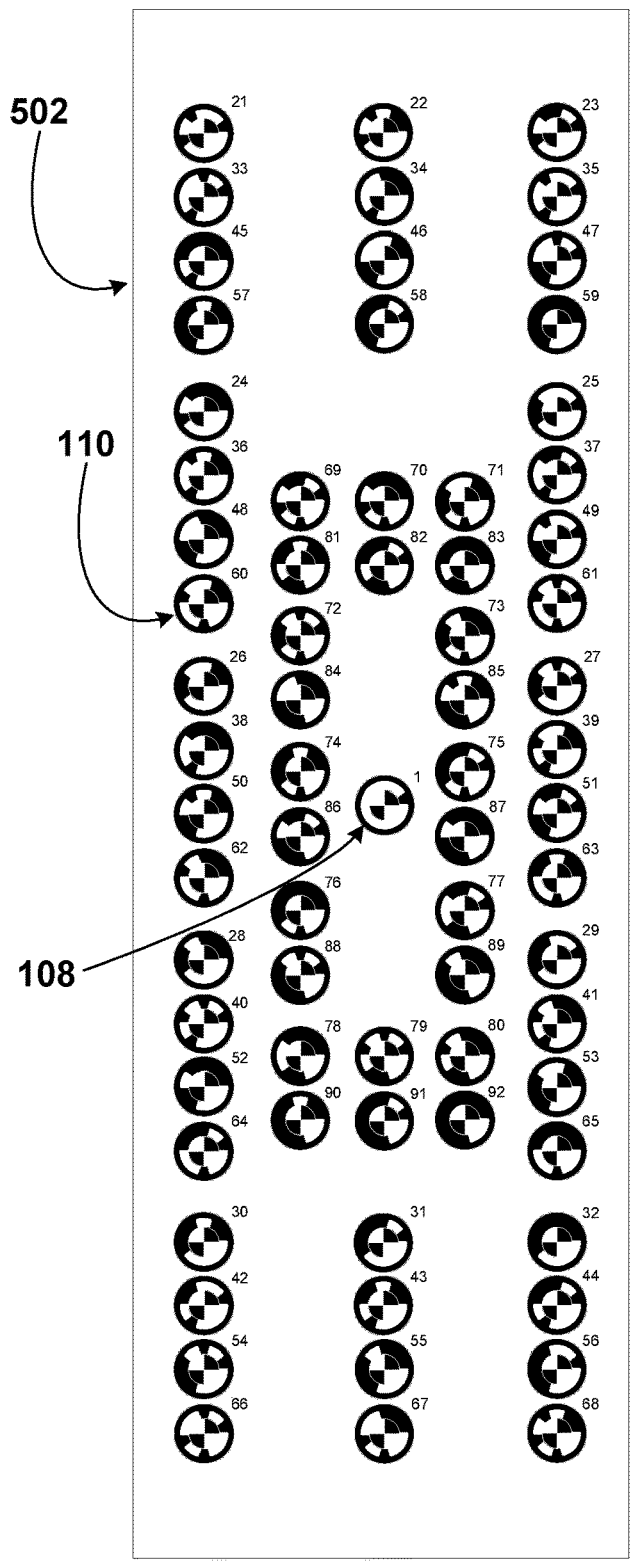
FIG. 5 is an illustration of a panel of a calibration target, according to example embodiments.

FIG. 5 illustrates a panel 502 of a calibration target. The panel 502 may be similar to the first panel 102 illustrated in FIG. 1B. As illustrated, the panel 502 has fiducial markers 110 thereon (e.g., located in patterns and/or arrangements on the panel 502). As before, only one of the fiducial markers 110 is labeled to prevent the figure from being cluttered. The difference between the first panel 102 illustrated in FIG. 1B and the panel 502 in FIG. 5 is that the panel-identification fiducial marker 108 is in a center portion of the panel 502 rather than at the corners. As such, there is only one panel-identification fiducial marker 108 in FIG. 5, rather than multiple. In alternate embodiments, there may be both a panel-identification fiducial marker in a center portion of the panel and panel-identification fiducial markers around corners or edges of the panel. Further, across a single calibration target the panel-identification fiducial markers may be located in different regions on different panels. For example, one panel may have a panel-identification fiducial marker in a center portion and another may have panel-identification fiducial markers at corners of the panel.

Figure 6A:
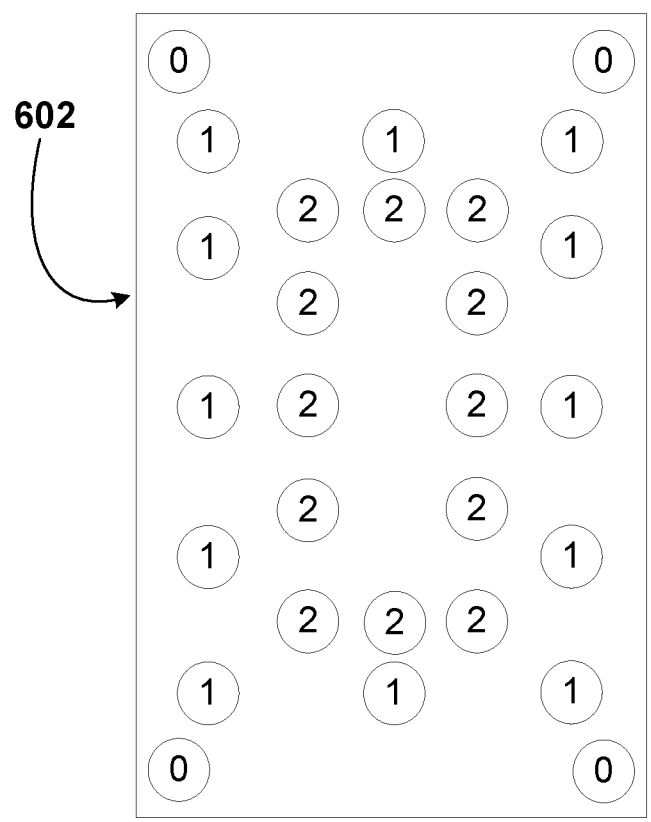
FIG. 6A is an illustration of a panel of a calibration target, according to example embodiments.

FIG. 6A is an illustration of a panel 602 of a calibration target (e.g., similar to the first panel 102 illustrated in FIG. 1A). The panel 602 may have multiple patterns of fiducial markers thereon. In FIG. 6A, a first pattern may include fiducial markers labeled with a "1" and a second pattern may include fiducial markers labeled with a "2". As illustrated, the second pattern may be a scaled version of the first pattern. Also as illustrated, the panel 602 may have panel-identification fiducial markers (e.g., labeled using a "0") at corners of the panel 602. Unlike the first panel 102 illustrated in FIG. 1A, the panel 602 may only include two rectangular patterns (as opposed to six). In various embodiments, various numbers of patterns may be included on each panel of the calibration target. Further, in some embodiments, different panels of the same calibration target may include differing numbers of patterns. Additionally or alternatively, in various embodiments, patterns on panels of calibration targets may have different shapes (e.g., other than rectangular). For example, in some embodiments, the patterns may be circular, triangular, pentagonal, hexagonal, heptagonal, octagonal, nonagonal, or decagonal in shape.

Figure 6B:
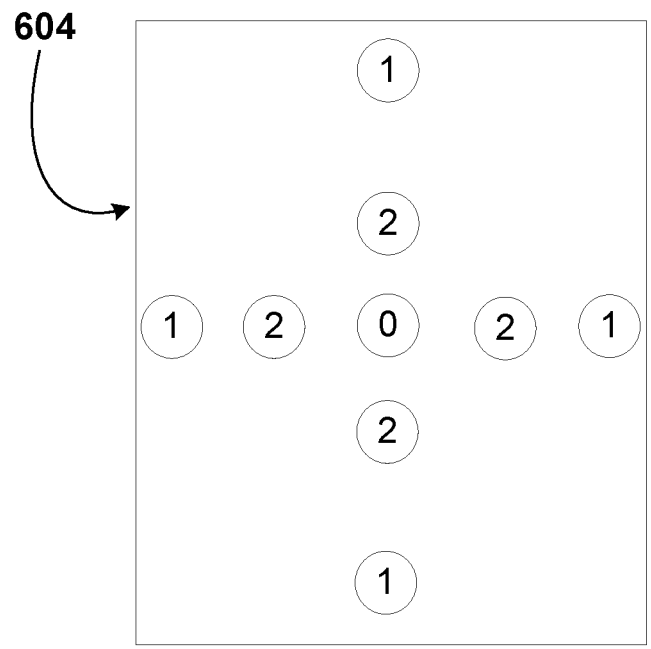
FIG. 6B is an illustration of a panel of a calibration target, according to example embodiments.

FIG. 6B is an illustration of a panel 604 of a calibration target (e.g., similar to the panel 602 illustrated in FIG. 6A). Unlike the panel 602 illustrated in FIG. 6A, however, the panel 604 in FIG. 6B has a single panel-identification fiducial marker (e.g., labeled with a "0") located in a center portion of the panel 604, rather than multiple panel-identification fiducial markers at corners of the panel. Further, the first pattern of fiducial markers (e.g., labeled with "1") and the second pattern of fiducial markers (e.g., labeled with "2") are in a slightly different orientation/shape with respect to the panel 604 in FIG. 6B than are the first and second patterns of fiducial markers in the panel 602 of FIG. 6A.

Figure 6C:
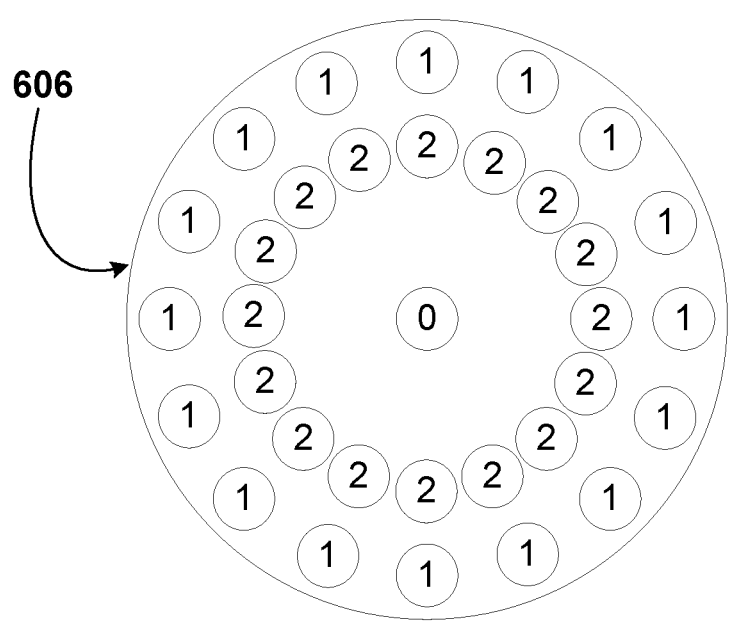
FIG. 6C is an illustration of a panel of a calibration target, according to example embodiments.

FIG. 6C is an illustration of a panel 606 of a calibration target (e.g., similar to the panel 602 illustrated in FIG. 6A). Unlike the panel 602 illustrated in FIG. 6A, however, the panel 606 in FIG. 6C is a circular panel. Additionally, similar to the panel 604 illustrated in FIG. 6B, the panel 606 has a single panel-identification fiducial marker (e.g., labeled with a "0") located in a center portion of the panel 606. Further, the shape of the first pattern of fiducial markers (e.g., labeled with "1") and the second pattern of fiducial markers (e.g., labeled with "2") is circular. Circular patterns of fiducial markers may match the shape of the panel 606 and thus allow for an efficient use of space on the panel 606.

Figure 6D:
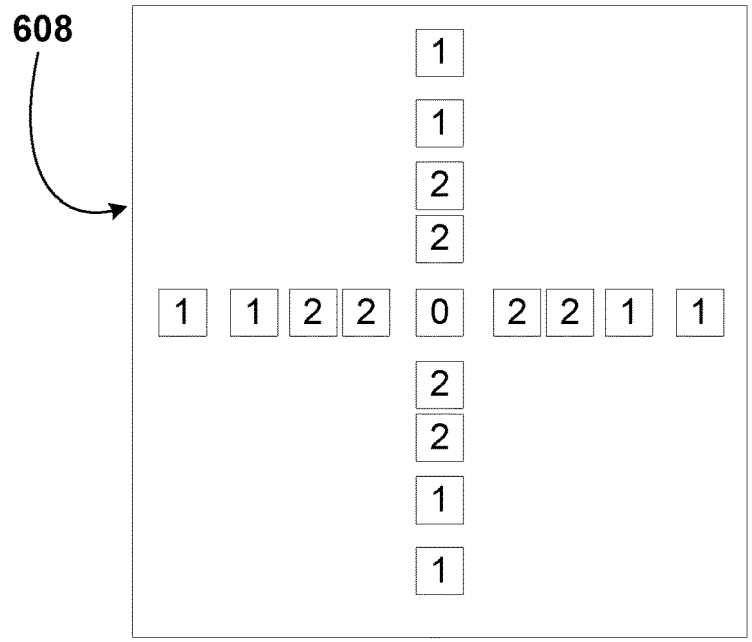
FIG. 6D is an illustration of a panel of a calibration target, according to example embodiments.

FIG. 6D is an illustration of a panel 608 of a calibration target (e.g., similar to the panel 604 illustrated in FIG. 6B). Unlike the panel 604 illustrated in FIG. 6B, however, the panel 608 in FIG. 6D has fiducial markers that are rectangular (e.g., square) in shape, rather than circular. Rectangular fiducial markers may match the shape of the panel 608 and thus allow for an efficient use of space on the panel 608 or alignment of fiducial markers in patterns on the panel 608.

Figure 6E:
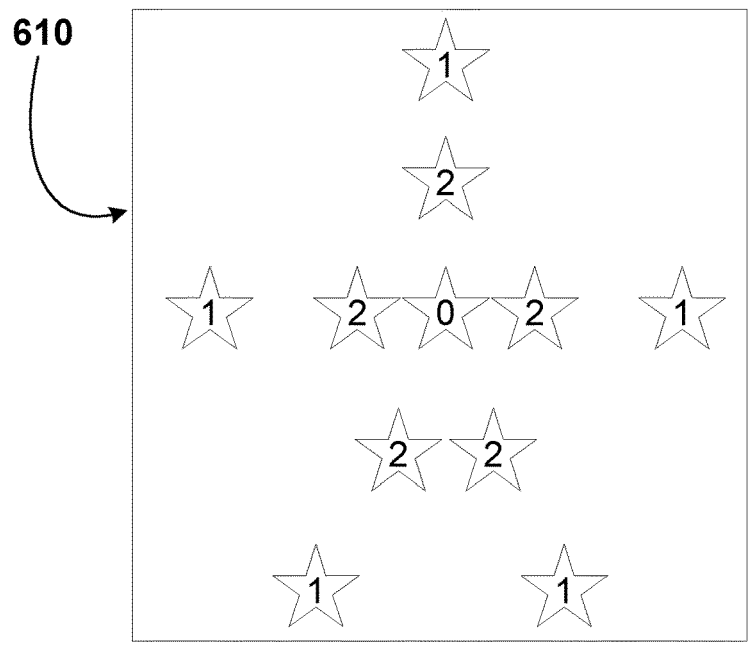
FIG. 6E is an illustration of a panel of a calibration target, according to example embodiments.

FIG. 6E is an illustration of a panel 610 of a calibration target (e.g., similar to the panel 604 illustrated in FIG. 6B). Unlike the panel 604 illustrated in FIG. 6B, however, the panel 610 in FIG. 6E has fiducial markers that are star-shaped, rather than circular. Further, as illustrated in FIG. 6E, the star-shaped fiducial markers may coincide with a first pattern of fiducial markers (e.g., labeled with "1") and a second pattern of fiducial markers (e.g., labeled with "0") having fiducial markers placed within the respective patterns at points of a star shape. In other words, the star-shaped pattern of the fiducial markers may be mirrored by the first and second patterns.

III. Example Processes

Figure 7:
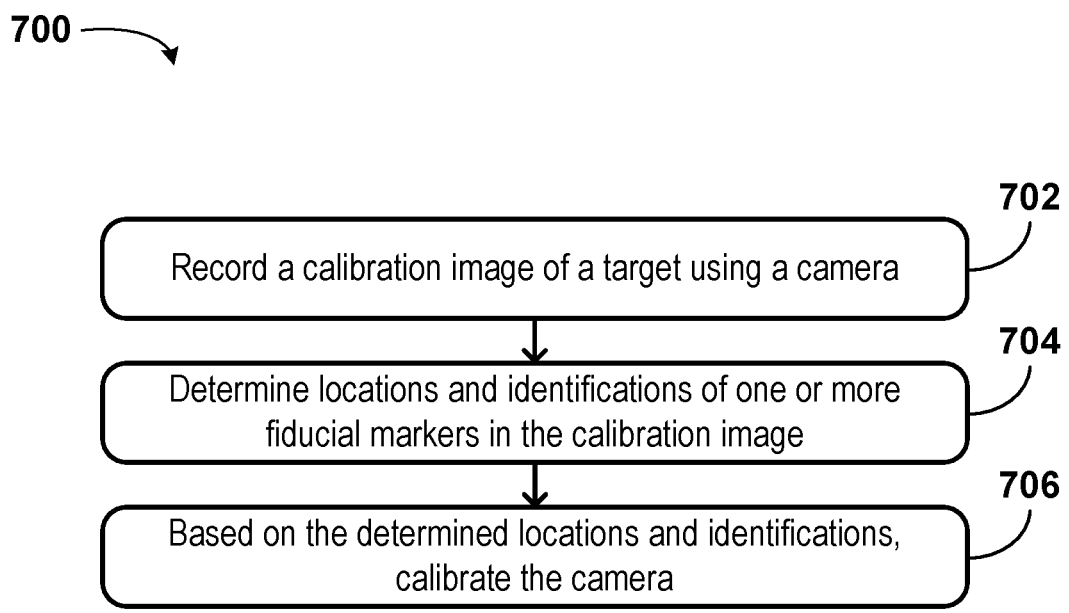
FIG. 7 is a flowchart illustration of a method, according to example embodiments.

FIG. 7 is a flowchart illustration of a method 700, according to example embodiments. The method 700 described may include one or more operations, functions, or actions as illustrated by one or more of the blocks. Although the blocks are illustrated in a sequential order, these blocks may in some instances be performed in parallel, or in a different order than those described herein. Also, the various blocks may be combined into fewer blocks, divided into additional blocks, or removed based upon the desired implementation. Further additional blocks describing additional, non-essential steps may be included in some variations of the methods contemplated herein.

In some embodiments, one or more of the blocks of FIG. 7 may be performed by a computing device. The computing device may include computing components such as a non-volatile memory (e.g., a hard drive or a read-only memory (ROM)), a volatile memory (e.g., a random-access memory (RAM), such as dynamic random-access memory (DRAM) or static random-access memory (SRAM)), a user-input device (e.g., a mouse or a keyboard), a display (e.g., an light-emitting diode (LED) display or a liquid crystal display (LCD)), and/or a network communication controller (e.g., a WIFI® controller, based on IEEE 802.11 standards, or an Ethernet controller). The computing device, for example, may execute instructions stored on a non-transitory, computer-readable medium (e.g., a hard drive) to perform one or more of the operations described herein.

At block 702, the method 700 may include capturing or recording a calibration image of a target using a camera. The target may include a first panel having a first arrangement of fiducial markers thereon. Each of the fiducial markers in the first arrangement may be unique among fiducial markers in the first arrangement. The target may also include a second panel, disposed at a first angle relative to the first panel, having a second arrangement of fiducial markers thereon. Each of the fiducial markers in the second arrangement may be unique among fiducial markers in the second arrangement. The first arrangement of the fiducial markers may be the same as (i.e., match) the second arrangement of fiducial markers.

In some embodiments, the first panel may further include one or more first-panel-identification fiducial markers that uniquely identify the first panel. Additionally or alternatively, the first arrangement may include a first pattern of fiducial markers and a second pattern of fiducial markers. Further, the second pattern of fiducial markers may be a scaled version of the first pattern of fiducial markers. Still further, the second panel may include one or more second-panel-identification fiducial markers that uniquely identify the second panel. The second arrangement may additionally include a third pattern of fiducial markers and a fourth pattern of fiducial markers. The third pattern of fiducial markers may match the first pattern of fiducial markers and the fourth pattern of fiducial markers may match the second pattern of fiducial markers.

At block 704, the method 700 may include determining locations and identifications of one or more fiducial markers in the calibration image.

At block 706, the method 700 may include, based on the determined locations and identifications, calibrating the camera.

Calibrating the camera may include determining correlations between the determined locations and identifications of the one or more fiducial markers in the calibration image and locations and identifications of the one or more fiducial markers on the calibration target. Based on these determined correlations, parameters of a camera matrix may be estimated using a pinhole camera model. Using the pinhole camera model may include determining a three-dimensional location of a pinhole representing an aperture of the camera using the determined correlations. Additionally or alternatively, calibrating the camera may include accounting for radial distortions or tangential distortions.

In one example embodiment, the method 700 may include splitting the captured or recorded calibration images into multiple simulated calibration images (e.g., one simulated calibration image for each pattern within each panel). The multiple simulated calibration images of multiple patterns may then be used to represent multiple actual calibration images captured or recorded of a single pattern (at a stationary 3D location) from multiple perspectives (e.g., multiple angles and/or multiple depths). Using the multiple simulated calibration images, camera parameters (e.g., parameters of a camera matrix corresponding to the pinhole camera model) may be optimized. This optimization may correspond to a minimized reprojection error in mapping the 3D location of each fiducial marker to the 2D location of the fiducial markers in the calibration images.

In some embodiments, the locations and identifications of the one or more fiducial markers on the calibration target (i.e., "ground truth") may be established based on one or more methods used to print fiducial markers on panels of the calibration target, methods used to arrange panels of the calibration target relative to one another, or other fabrication/assembly methods. Additionally or alternatively, the locations and identifications of the one or more fiducial markers on the calibration target may be established by another optical procedure. For example, using a light detection and ranging (LIDAR) system, precise locations of each of the fiducial markers within the calibration target may be determined.

Determining a three-dimensional location of a pinhole corresponding to the aperture of the camera using the determined correlations may be an NP-hard problem. As such, in some embodiments, once the location of the pinhole has been determined, additional calibrations may be performed to determine whether a camera matrix associated with the calibrated camera is still accurate to within a given degree (e.g., after a predefined amount of time has elapsed during which the camera may have become detuned). Determining whether the camera matrix is accurate to within a given degree may require fewer calculations, as such a comparison may not be an NP-hard problem (whereas the original determination of the camera matrix may be).

Further, calibrating the camera using the captured or recorded calibration images may include determining an angle, relative to the image sensor in the camera, where each pixel in the camera is facing. Determining an angle for each pixel may include generating a lookup table of angles for each pixel. Alternatively, determining an angle for each pixel may include generating a parametrization that describes the angles (e.g., a parameterization based on two, three, four, five, six, seven, eight, nine, ten, etc. variables). Generating a parametrization may be less computationally intensive than generating a lookup table.

In some embodiments, the method 700 may also include rotating the camera relative to the target and capturing or recording an additional calibration image. Rotating the camera relative to the target may include rotating the camera about a pitch axis (e.g., about an x-axis), about a roll axis (e.g., about a z-axis), about a yaw axis (e.g., about a y-axis), or about a superposition of axes selected from among the pitch axis, roll axis, and yaw axis. Rotating the camera may allow for one or more additional calibration images to be captured or recorded from different perspectives relative to the target. Additionally or alternatively, rotating the camera may allow for additional calibration images to be captured or recorded such that the entirety of the calibration target is captured or recorded among the set of calibration images. For example, if the field of view of the camera undergoing calibration is narrower (in one or more dimensions) than the calibration target based on the position of the camera relative to the calibration target, multiple calibration images may be captured or recorded of the calibration target such that the entirety of the calibration target is captured or recorded. In one embodiment, this may include capturing or recording a calibration image of a first panel of a calibration target, rotating (or translating) the camera such that it faces a second panel of the calibration target, capturing or recording a calibration image of the second panel of the calibration target, and then performing a calibration of the camera using both the calibration image of the first panel and the calibration image of the second panel. In alternate embodiments, a single calibration image or multiple calibration images of the calibration target may be captured or recorded without translating or rotating the target.

In some embodiments, the method 700 may also include translating the camera relative to the calibration target and capturing or recording an additional calibration image. Translating the camera relative to the calibration target may include translating the camera in a horizontal direction parallel to the calibration target (e.g., x-direction), a horizontal direction normal to the calibration target (e.g., z-direction), a vertical direction parallel to the calibration target (e.g., y-direction), or a superposition of directions selected from among the horizontal-parallel, horizontal-normal, and vertical-parallel direction. Translating the camera may allow for one or more additional calibration images to be captured or recorded from different perspectives relative to the target. A calibration of the camera may then be performed using both the calibration image captured or recorded before translating the camera and the one or more additional calibration images captured or recorded from different perspectives after translating the camera.

The method 700 may further include cropping the calibration image into two or more calibration sub-images (e.g., at least one sub-image of the first panel and at least one sub-image of the second panel). In this way, individual panels of the calibration target can be isolated and analyzed individually. Such an individual analysis of each calibration sub-image may take into account the fact that the first panel and the second panel may be at different angles with respect to the camera capturing or recording them (e.g., because the two different panels were simulating different camera positions relative to the calibration target).

In some embodiments, multiple calibration images may be captured or recorded using the calibration target. For example, a computing device may be connected to a stage on which the camera undergoing calibration is mounted (e.g., as part of a calibration system that includes the stage and the calibration target). The computing device may be configured to translate and rotate the stage relative to the calibration target. In such embodiments, the computing device may translate the camera relative to the calibration target stepwise. Additionally or alternatively, the computing device may rotate the camera relative to the calibration target stepwise. As the camera is translated or rotated in a stepwise fashion, calibration images may be captured or recorded of the calibration target from different perspectives of the camera. Each of the calibration images may be used as additional data for calibration. For example, a calibration target that has two panels at a given angle may simulate two angles in a single calibration image, but if the camera rotates stepwise and captures or records additional calibration images, two additional calibration angles may be obtained for each additional calibration image captured or recorded.

IV. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

The computer-readable medium can also include non-transitory computer-readable media such as computer-readable media that store data for short periods of time like register memory and processor cache. The computer-readable media can further include non-transitory computer-readable media that store program code and/or data for longer periods of time. Thus, the computer-readable media may include secondary or persistent long term storage, like ROM, optical or magnetic disks, solid state drives, compact-disc read only memory (CD-ROM), for example. The computer-readable media can also be any other volatile or non-volatile storage systems. A computer-readable medium can be considered a computer-readable storage medium, for example, or a tangible storage device.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

Embodiments of the present disclosure may thus relate to one of the enumerated example embodiments (EEEs) listed below.

EEE 1 is a target used for calibration, comprising:
a first panel having a first arrangement of fiducial markers thereon,
wherein each of the fiducial markers in the first arrangement is uniquely identifiable among fiducial markers in the first arrangement; and
a second panel, disposed at a first angle relative to the first panel, having a second arrangement of fiducial markers thereon,
wherein each of the fiducial markers in the second arrangement is uniquely identifiable among fiducial markers in the second arrangement, and
wherein the first arrangement of fiducial markers matches the second arrangement of fiducial markers.

EEE 2 is the target of EEE 1,
wherein the first panel further comprises one or more first-panel-identification fiducial markers that uniquely identify the first panel, and
wherein the second panel further comprises one or more second-panel-identification fiducial markers that uniquely identify the second panel.

EEE 3 is the target of EEE 2,
wherein the one or more first-panel-identification fiducial markers are disposed in one or more corners of the first panel, and
wherein the one or more second-panel-identification fiducial markers are disposed in one or more corners of the second panel.

EEE 4 is the target of any of EEEs 1-3, wherein the fiducial markers in the first arrangement and the second arrangement are circular in shape.

EEE 5 is the target of any of EEEs 1-4, wherein the fiducial markers in the first arrangement and the second arrangement comprise crosshairs that identify a center of each respective fiducial marker.

EEE 6 is the target of any of EEEs 1-5, wherein the fiducial markers in the first arrangement and the second arrangement are each uniquely labeled by respective angular barcodes.

EEE 7 is the target of EEE 6, wherein the angular barcodes comprise a ten-bit encoding scheme where each bit is represented by a light or dark section representing a 1 or a 0.

EEE 8 is the target of EEE 6, wherein the angular barcodes are rotationally unique such that, even if rotated by any angle, the angular barcodes will not match one another.

EEE 9 is the target of any of EEEs 1-8, further comprising:
a third panel having a third arrangement of fiducial markers thereon,
wherein each of the fiducial markers in the third arrangement is uniquely identifiable among fiducial markers in the third arrangement, and
wherein the third panel further comprises one or more third-panel-identification fiducial markers that uniquely identify the third panel; and
a fourth panel, disposed at a second angle relative to the third panel, having a fourth arrangement of fiducial markers thereon,
wherein each of the fiducial markers in the fourth arrangement is uniquely identifiable among fiducial markers in the fourth arrangement,
wherein the fourth panel further comprises one or more fourth-panel-identification fiducial markers that uniquely identify the fourth panel, and
wherein the second angle is not equal to the first angle.

EEE 10 is the target of EEE 9,
wherein the third panel and the fourth panel are disposed at a third angle relative to the first panel and the second panel, and
wherein the third angle is about a different axis than the first angle and the second angle.

EEE 11 is the target of any of EEEs 1-10,
wherein the first arrangement comprises a first pattern of fiducial markers and a second pattern of fiducial markers,
wherein the second arrangement comprises a third pattern of fiducial markers and a fourth pattern of fiducial markers,
wherein the second pattern of fiducial markers is a scaled version of the first pattern of fiducial markers, and
wherein the third pattern of fiducial markers matches the first pattern of fiducial markers and the fourth pattern of fiducial markers matches the second pattern of fiducial markers.

EEE 12 is the target of any of EEEs 1-11, wherein the fiducial markers in the second arrangement pattern are 180-degree rotations of the fiducial markers in the first arrangement at a corresponding location.

EEE 13 is the target of any of EEEs 1-12,
wherein the fiducial markers in the first arrangement comprise a first color and the fiducial markers in the second arrangement comprise a second color, and
wherein the first color and the second color are different colors.

EEE 14 is a method, comprising:
recording a calibration image of a target using a camera,
wherein the target comprises:
a first panel having a first arrangement of fiducial markers thereon, wherein each of the fiducial markers in the first arrangement is uniquely identifiable among fiducial markers in the first arrangement; and a second panel, disposed at a first angle relative to the first panel, having a second arrangement of fiducial markers thereon, wherein each of the fiducial markers in the second arrangement is uniquely identifiable among fiducial markers in the second arrangement, and wherein the first arrangement of fiducial markers matches the second arrangement of fiducial markers; and determining locations and identifications of one or more fiducial markers in the calibration image; and based on the determined locations and identifications, calibrating the camera.

EEE 15 is the method of EEE 14, wherein calibrating the camera comprises using correlations between locations of the fiducial markers on the first panel and locations of the fiducial markers on the second panel to estimate parameters of a camera matrix using a pinhole camera model.

EEE 16 is the method of EEEs 14 or 15,
wherein the first arrangement comprises a first pattern of fiducial markers and a second pattern of fiducial markers, and
wherein the second pattern of fiducial markers is a scaled version of the first pattern of fiducial markers.

EEE 17 is the method of any of EEEs 14-16, further comprising:
rotating the camera relative to the target and recording an additional calibration image; and
determining locations and identifications of one or more fiducial markers in the additional calibration image.

EEE 18 is the method of EEE 17, wherein rotating the camera relative to the target comprises rotating the camera about at least one of a pitch axis of the camera or a roll axis of the camera.

EEE 19 is the method of any of EEEs 14-18, further comprising:
moving the camera and recording an additional calibration image; and
determining locations and identifications of one or more fiducial markers in the additional calibration image.

EEE 20 is a system used for calibrating a camera, comprising:
a target, comprising:
a first panel having a first arrangement of fiducial markers thereon,
wherein each of the fiducial markers in the first arrangement is uniquely identifiable among fiducial markers in the first arrangement; and
a second panel, disposed at a first angle relative to the first panel, having a second arrangement of fiducial markers thereon,
wherein each of the fiducial markers in the second arrangement is uniquely identifiable among fiducial markers in the second arrangement, and
wherein the first arrangement of fiducial markers matches the second arrangement of fiducial markers; and
a stage configured to translate or rotate the camera with respect to the target.

EEE 21 is a target used for calibration, comprising:
a first pattern of fiducial markers; and
a second pattern of fiducial markers,
wherein the first pattern of fiducial markers is a scaled version of the second pattern of fiducial markers, such that a calibration image captured of the target simulates multiple images of a single pattern captured at multiple calibration perspectives.

EEE 22 is the target of EEE 21, wherein the fiducial markers in the first pattern and the fiducial markers in the second pattern are circular in shape.

EEE 23 is the target of EEEs 21 or 22, wherein the fiducial markers in the first pattern and the fiducial markers in the second pattern comprise crosshairs that identify a center of each respective fiducial marker.

EEE 24 is the target of any of EEEs 21-23, wherein each of the fiducial markers in the first pattern and each of the fiducial markers in the second pattern are uniquely identifiable relative to other fiducial markers of the target.

EEE 25 is the target of EEE 24, wherein the fiducial markers in the first pattern and the fiducial markers in the second pattern are each uniquely labeled by respective angular barcodes.

EEE 26 is the target of EEE 25, wherein the angular barcodes comprise a ten-bit encoding scheme where each bit is represented by a light or dark section representing a 1 or a 0.

EEE 27 is the target of EEE 25, wherein the angular barcodes are rotationally unique such that, even if rotated by any angle, the angular barcodes will not match one another.

EEE 28 is a method, comprising:
recording a calibration image of a target using a camera, wherein the target comprises:
a first panel having a first arrangement of fiducial markers thereon,
wherein each of the fiducial markers in the first arrangement is uniquely identifiable among fiducial markers in the first arrangement; and
a second panel, disposed at a first angle relative to the first panel, having a second arrangement of fiducial markers thereon,
wherein each of the fiducial markers in the second arrangement is uniquely identifiable among fiducial markers in the second arrangement, and
wherein the first arrangement of fiducial markers matches the second arrangement of fiducial markers; and
determining locations and identifications of one or more fiducial markers in the calibration image; and
based on the determined locations and identifications, calibrating the camera.

EEE 29 is the method of EEE 28, wherein the fiducial markers in the second arrangement are 180-degree rotations of the fiducial markers in the first arrangement at a corresponding location.

EEE 30 is the method of EEEs 28 or 29,
wherein the fiducial markers in the first arrangement comprise a first color and the fiducial markers in the second arrangement comprise a second color, and
wherein the first color and the second color are different colors.

EEE 31 is the method of any of EEEs 28-30,
wherein the first panel comprises one or more first-panel-identification fiducial markers that uniquely identify the first panel, and
wherein the second panel comprises one or more second-panel-identification fiducial markers.

EEE 32 is the method of EEE 31,
wherein the one or more first-panel-identification fiducial markers are disposed in one or more corners of the first panel, and wherein the one or more second-panel-identification fiducial markers are disposed in one or more corners of the second panel.

EEE 33 is the method of any of EEEs 28-32, wherein the target further comprises:
  a third panel having a third arrangement of fiducial markers thereon,
  wherein each of the fiducial markers in the third arrangement is uniquely identifiable among fiducial markers in the third arrangement; and
  a fourth panel, disposed at a second angle relative to the third panel, having a fourth arrangement of fiducial markers thereon,
  wherein each of the fiducial markers in the fourth arrangement is uniquely identifiable among fiducial markers in the fourth arrangement,
  wherein the third arrangement of fiducial markers and the fourth arrangement of fiducial markers each match the first arrangement of fiducial markers and the second arrangement of fiducial markers, and
  wherein the second angle is not equal to the first angle.

EEE 34 is the method of EEE 33,
  wherein the third panel and the fourth panel are disposed at a third angle relative to the first panel and the second panel, and
  wherein the third angle is about a different axis than the first angle and the second angle.

EEE 35 is the method of any of EEEs 28-34, wherein calibrating the camera comprises using correlations between locations of the fiducial markers on the first panel and locations of the fiducial markers on the second panel to estimate parameters of a camera matrix using a pinhole camera model.

EEE 36 is the method of any of EEEs 28-35,
  wherein the first arrangement comprises a first pattern of fiducial markers and a second pattern of fiducial markers, and
  wherein the second pattern of fiducial markers is a scaled version of the first pattern of fiducial markers.

EEE 37 is the method of any of EEEs 28-36,
  rotating the camera relative to the target and recording an additional calibration image; and
  determining locations and identifications of one or more fiducial markers in the additional calibration image.

EEE 38 is the method of EEE 37, wherein rotating the camera relative to the target comprises rotating the camera about at least one of a pitch axis of the camera or a roll axis of the camera.

EEE 39 is the method of any of EEEs 28-38, further comprising:
  moving the camera and recording an additional calibration image; and
  determining locations and identifications of one or more fiducial markers in the additional calibration image.

EEE 40 is a system used for calibrating a camera, comprising:
  a target, comprising:
    a first pattern of fiducial markers; and
    a second pattern of fiducial markers,
    wherein the first pattern of fiducial markers is a scaled version of the second pattern of fiducial markers, such that a calibration image captured of the target simulates multiple images of a single pattern captured at multiple calibration perspectives; and
  a stage configured to translate or rotate the camera with respect to the target.

What is claimed:

1. A target used for calibration, comprising:
   a first pattern of fiducial markers;
   a second pattern of fiducial markers,
   wherein the first pattern is a scaled version of the second pattern, such that a calibration image captured of the target simulates multiple images of a single pattern captured at multiple calibration perspectives; and
   one or more panel-identification fiducial markers that uniquely identify the target used for calibration.

2. The target of claim 1, wherein the fiducial markers in the first pattern and the fiducial markers in the second pattern are circular in shape.

3. The target of claim 1, wherein the fiducial markers in the first pattern have a different shape than the fiducial markers in the second pattern.

4. The target of claim 1, wherein each of the fiducial markers in the first pattern and each of the fiducial markers in the second pattern are uniquely identifiable relative to other fiducial markers of the target.

5. The target of claim 4, wherein the fiducial markers in the first pattern and the fiducial markers in the second pattern are each uniquely labeled by respective angular barcodes.

6. The target of claim 5, wherein the angular barcodes comprise a ten-bit encoding scheme where each bit is represented by a light or dark section representing a 1 or a 0.

7. The target of claim 5, wherein the angular barcodes are rotationally unique such that, even if rotated by any angle, the angular barcodes will not match one another.

8. A method, comprising:
   recording a calibration image of a target using a camera, wherein the target comprises:
     a first panel having a first arrangement of fiducial markers thereon,
     wherein each of the fiducial markers in the first arrangement is uniquely identifiable among fiducial markers in the first arrangement; and
     a second panel, disposed at a first angle relative to the first panel, having a second arrangement of fiducial markers thereon,
     wherein each of the fiducial markers in the second arrangement is uniquely identifiable among fiducial markers in the second arrangement,
     wherein the first arrangement matches the second arrangement, and
     wherein the first panel comprises one or more first-panel-identification fiducial markers that uniquely identify the first panel; and
   determining locations and identifications of one or more fiducial markers in the calibration image; and
   based on the determined locations and identifications, calibrating the camera.

9. The method of claim 8, wherein the fiducial markers in the second arrangement are 180-degree rotations of the fiducial markers in the first arrangement at a corresponding location.

10. The method of claim 8,
    wherein the fiducial markers in the first arrangement comprise a first color and the fiducial markers in the second arrangement comprise a second color, and
    wherein the first color and the second color are different colors.

11. The method of claim 8,
    wherein the second panel comprises one or more second-panel-identification fiducial markers.

12. The method of claim 11,
wherein the one or more first-panel-identification fiducial markers are disposed in one or more corners of the first panel, and
wherein the one or more second-panel-identification fiducial markers are disposed in one or more corners of the second panel.

13. The method of claim 8, wherein the target further comprises:
a third panel having a third arrangement of fiducial markers thereon,
wherein each of the fiducial markers in the third arrangement is uniquely identifiable among fiducial markers in the third arrangement; and
a fourth panel, disposed at a second angle relative to the third panel, having a fourth arrangement of fiducial markers thereon,
wherein each of the fiducial markers in the fourth arrangement is uniquely identifiable among fiducial markers in the fourth arrangement,
wherein the third arrangement of fiducial markers and the fourth arrangement of fiducial markers each match the first arrangement of fiducial markers and the second arrangement of fiducial markers, and
wherein the second angle is not equal to the first angle.

14. The method of claim 13,
wherein the third panel and the fourth panel are disposed at a third angle relative to the first panel and the second panel, and
wherein the third angle is about a different axis than the first angle and the second angle.

15. The method of claim 8, wherein calibrating the camera comprises using correlations between locations of the fiducial markers on the first panel and locations of the fiducial markers on the second panel to estimate parameters of a camera matrix using a pinhole camera model.

16. The method of claim 8,
wherein the first arrangement comprises a first pattern of fiducial markers and a second pattern of fiducial markers, and
wherein the second pattern is a scaled version of the first pattern.

17. The method of claim 8, further comprising:
rotating the camera relative to the target and recording an additional calibration image; and
determining locations and identifications of one or more fiducial markers in the additional calibration image.

18. The method of claim 17, wherein rotating the camera relative to the target comprises rotating the camera about a roll axis of the camera.

19. The method of claim 8, further comprising:
moving the camera and recording an additional calibration image; and
determining locations and identifications of one or more fiducial markers in the additional calibration image.

20. A system used for calibrating a camera, comprising:
a target, comprising:
a first pattern of fiducial markers;
a second pattern of fiducial markers,
wherein the first pattern is a scaled version of the second pattern, such that a calibration image captured of the target simulates multiple images of a single pattern captured at multiple calibration perspectives; and
one or more panel-identification fiducial markers that uniquely identify the target; and
a stage configured to translate or rotate the camera with respect to the target.

* * * * *